US012561929B2

(12) United States Patent
Cha et al.

(10) Patent No.: US 12,561,929 B2
(45) Date of Patent: Feb. 24, 2026

(54) METHOD AND ELECTRONIC DEVICE FOR PROVIDING INFORMATION RELATED TO PLACING OBJECT IN SPACE

(71) Applicant: SAMSUNG ELECTRONICS CO., LTD., Suwon-si (KR)

(72) Inventors: Kihoon Cha, Suwon-si (KR); Sihyun Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 204 days.

(21) Appl. No.: 18/371,897

(22) Filed: Sep. 22, 2023

(65) Prior Publication Data

US 2024/0119687 A1 Apr. 11, 2024

Related U.S. Application Data

(63) Continuation of application No. PCT/KR2023/013664, filed on Sep. 12, 2023.

(30) Foreign Application Priority Data

Oct. 7, 2022 (KR) ........................ 10-2022-0129030
Nov. 7, 2022 (KR) ........................ 10-2022-0147412

(51) Int. Cl.
G06T 19/20 (2011.01)
G06T 7/13 (2017.01)
G06T 7/73 (2017.01)

(52) U.S. Cl.
CPC ................ *G06T 19/20* (2013.01); *G06T 7/13* (2017.01); *G06T 7/73* (2017.01); *G06T 2200/24* (2013.01);
(Continued)

(58) Field of Classification Search
None
See application file for complete search history.

(56) References Cited

U.S. PATENT DOCUMENTS 10,789,622 B2 9/2020 Ayush et al.
10,917,613 B1 2/2021 Chiarella et al.
(Continued)

FOREIGN PATENT DOCUMENTS

KR 10-2215100 B1 2/2021
KR 10-2021-0083573 A 7/2021
(Continued)

OTHER PUBLICATIONS

Fanfan WU, Feihu YA, Weimin SH, Zhong ZH. 3D scene graph prediction from point clouds. Virtual Reality & Intelligent Hardware. Feb. 1, 2022;4(1):76-88. (Year: 2022).*
(Continued)

*Primary Examiner* — Zhengxi Liu
(74) *Attorney, Agent, or Firm* — Sughrue Mion, PLLC

(57) ABSTRACT

A method of providing information related to placing an object in a space includes obtaining three-dimensional spatial data corresponding to the space and object-related data for first objects in the space, obtaining a spatial graph including positional relations between the first objects in the space, based on the three-dimensional spatial data and the object-related data, receiving a user input for changing an object placement in the space, based on the user input, adding, to the spatial graph, an empty node representing a second object to be placed in an empty region in the space in which the first objects are not placed, updating the spatial graph by applying, to a graph neural network (GNN), the spatial graph to which the empty node has been added, and outputting object placement change-related information for the space, based on the updated spatial graph.

18 Claims, 21 Drawing Sheets

(52) U.S. Cl.
CPC .............. *G06T 2207/20084* (2013.01); *G06T 2219/2004* (2013.01)

(56) References Cited

U.S. PATENT DOCUMENTS

| | | |
|---|---|---|
| 11,127,074 B2 | 9/2021 | Ghadar et al. |
| 2013/0212513 A1 | 8/2013 | Loberg |
| 2015/0160838 A1 | 6/2015 | Shirabe |
| 2017/0256096 A1 | 9/2017 | Faaborg et al. |
| 2018/0137215 A1 | 5/2018 | Lee et al. |
| 2021/0272368 A1 | 9/2021 | Dorin et al. |
| 2022/0058883 A1 | 2/2022 | Yan et al. |
| 2022/0129976 A1 | 4/2022 | Ukishiro et al. |
| 2023/0125988 A1 | 4/2023 | Lee et al. |
| 2024/0020962 A1* | 1/2024 | Gubbi Lakshminarasimha .......... G06V 10/42 |

FOREIGN PATENT DOCUMENTS

| | | |
|---|---|---|
| KR | 10-2021-0105550 A | 8/2021 |
| KR | 10-2357429 B1 | 2/2022 |
| WO | 2021/030449 A1 | 2/2021 |
| WO | 2021/263018 A1 | 12/2021 |

OTHER PUBLICATIONS

Wu Z, Pan S, Chen F, Long G, Zhang C, Philip SY. A comprehensive survey on graph neural networks. IEEE transactions on neural networks and learning systems. Mar. 24, 2020;32(1):4-24. (Year: 2020).*

Fisher M, Hanrahan P. Context-based search for 3d models. InACM SIGGRAPH Asia 2010 papers Dec. 15, 2010 (pp. 1-10). (Year: 2010).*

Wald J, Dhamo H, Navab N, Tombari F. Learning 3d semantic scene graphs from 3d indoor reconstructions. InProceedings of the IEEE/CVF Conference on Computer Vision and Pattern Recognition 2020 (pp. 3961-3970). (Year: 2020).*

Lee YJ, Grauman K. Object-graphs for context-aware category discovery. In2010 IEEE Computer Society Conference on Computer Vision and Pattern Recognition Jun. 13, 2010 (pp. 1-8). IEEE. (Year: 2010).*

Sonogashira M, Iiyama M, Kawanishi Y. Towards open-set scene graph generation with unknown objects. IEEE Access. Jan. 21, 2022;10:11574-83. (Year: 2022).*

Shin, Donghyeop et al., "Deep Neural Network-Based Scene Graph Generation for 3D Simulated Indoor Environments", KIPS Trans. Softw. and Data Eng., vol. 8, No. 5, pp. 205-212. (8 pages total) 2019.

Shin, D. and Kim, I. (2019). "Deep Neural Network-Based Scene Graph Generation for 3D Simulated Indoor Environments", KIPS Transactions on Software and Data Engineering, Korean Information Processing Society, 8(5), pp. 205-212, doi: 10.3745/KTSDE. 2019.8.5.205.

Shin, Donghyeop & Kim, Incheol. (2019). "Modelling Dynamics of Indoor Environments with 3D Scene Graphs", Journal of Institute of Control, Robotics and Systems, 25, pp. 690-704, doi: 10.5302/J. ICROS.2019.19.0105.

International Search Report (PCT/ISA/210) issued by the International Searching Authority on Dec. 13, 2023 in corresponding International Application No. PCT/KR2023/013664.

Communication issued on Jul. 18, 2025 by the European Patent Office in European Patent Application No. 23875090.5.

* cited by examiner

FIG. 1

THREE-DIMENSIONAL — 310
SPATIAL DATA

THREE-DIMENSIONAL SCAN

OBJECT-RELATED DATA — 320

FIG. 3B

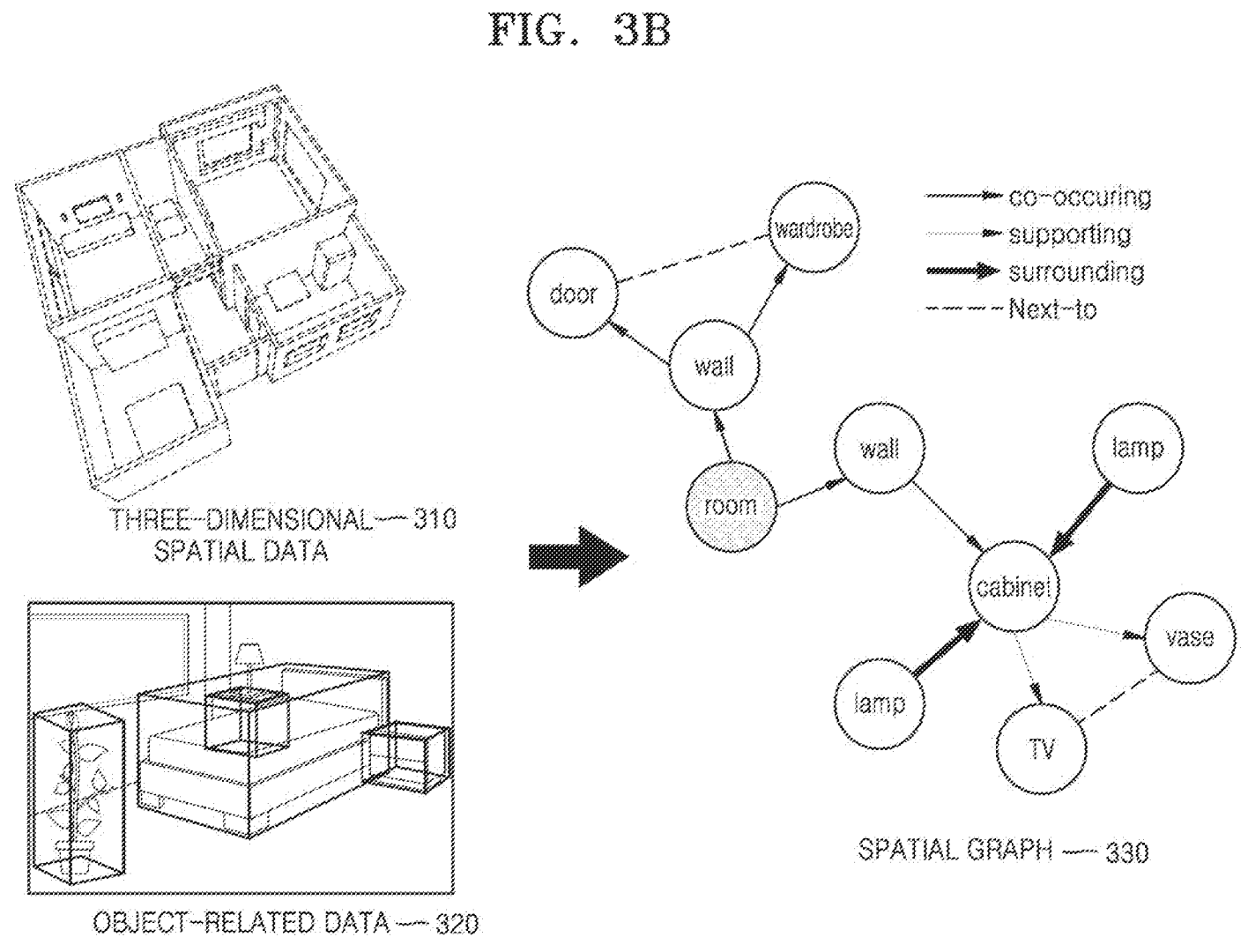

THREE-DIMENSIONAL—310
SPATIAL DATA

OBJECT-RELATED DATA—320

SPATIAL GRAPH—330 co-occuring
supporting
surrounding
Next-to wardrobe
door
wall
wall
room
lamp
cabinet
lamp
vase
TV

FIG. 6A

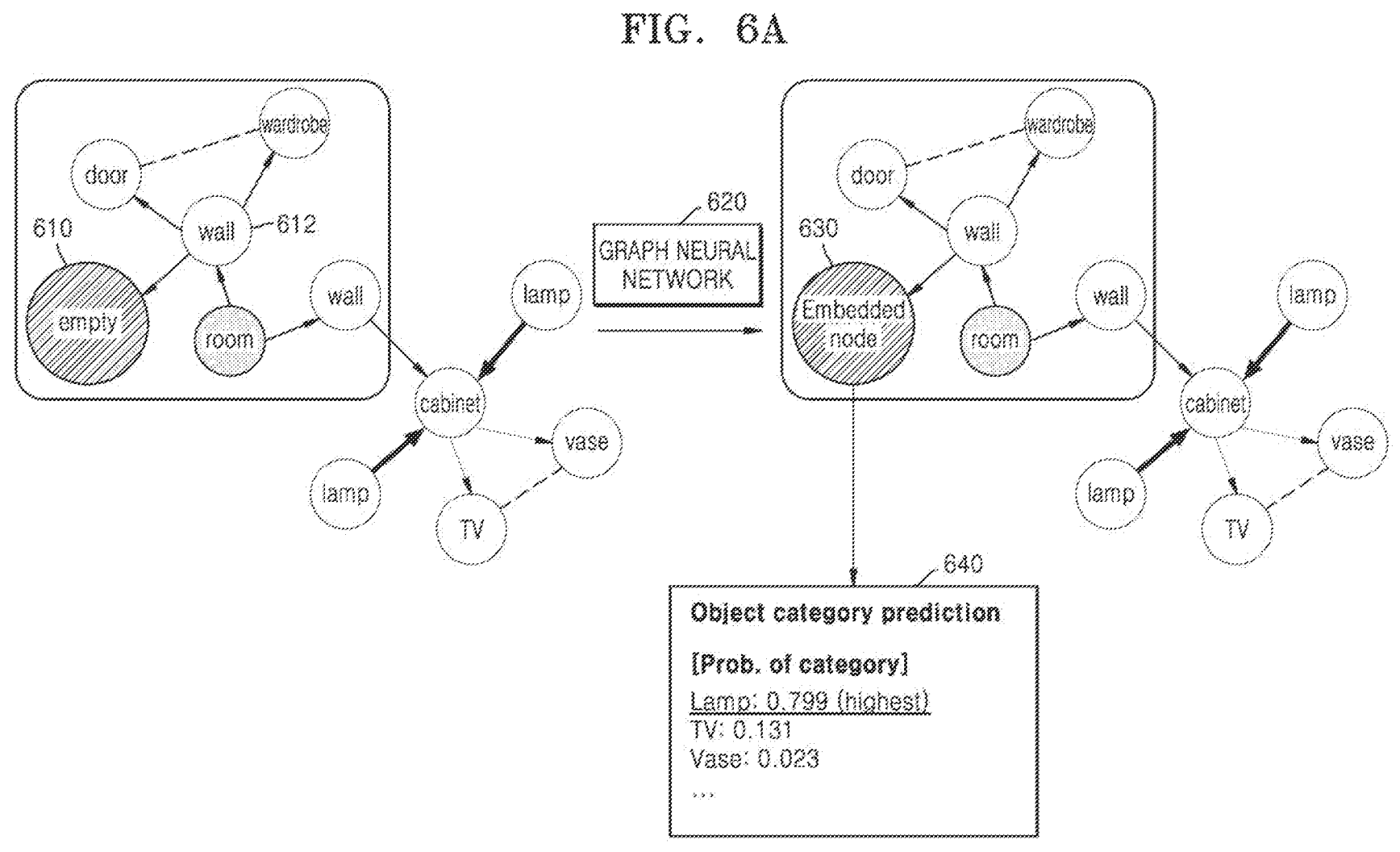

GRAPH NEURAL NETWORK
620 wall
612
wall
wardrobe
door
room
empty
610
cabinet
lamp
vase
TV
lamp wall
wall
wardrobe
door
room
Embedded node
630
cabinet
lamp
vase
TV
lamp

640

Object category prediction

[Prob. of category]
Lamp: 0.799 (highest)
TV: 0.131
Vase: 0.023
...

OBJECT INPUT

POSITION IN WHICH OBJECT TO BE PLACED

1010 plant table chair

Figure 10A:
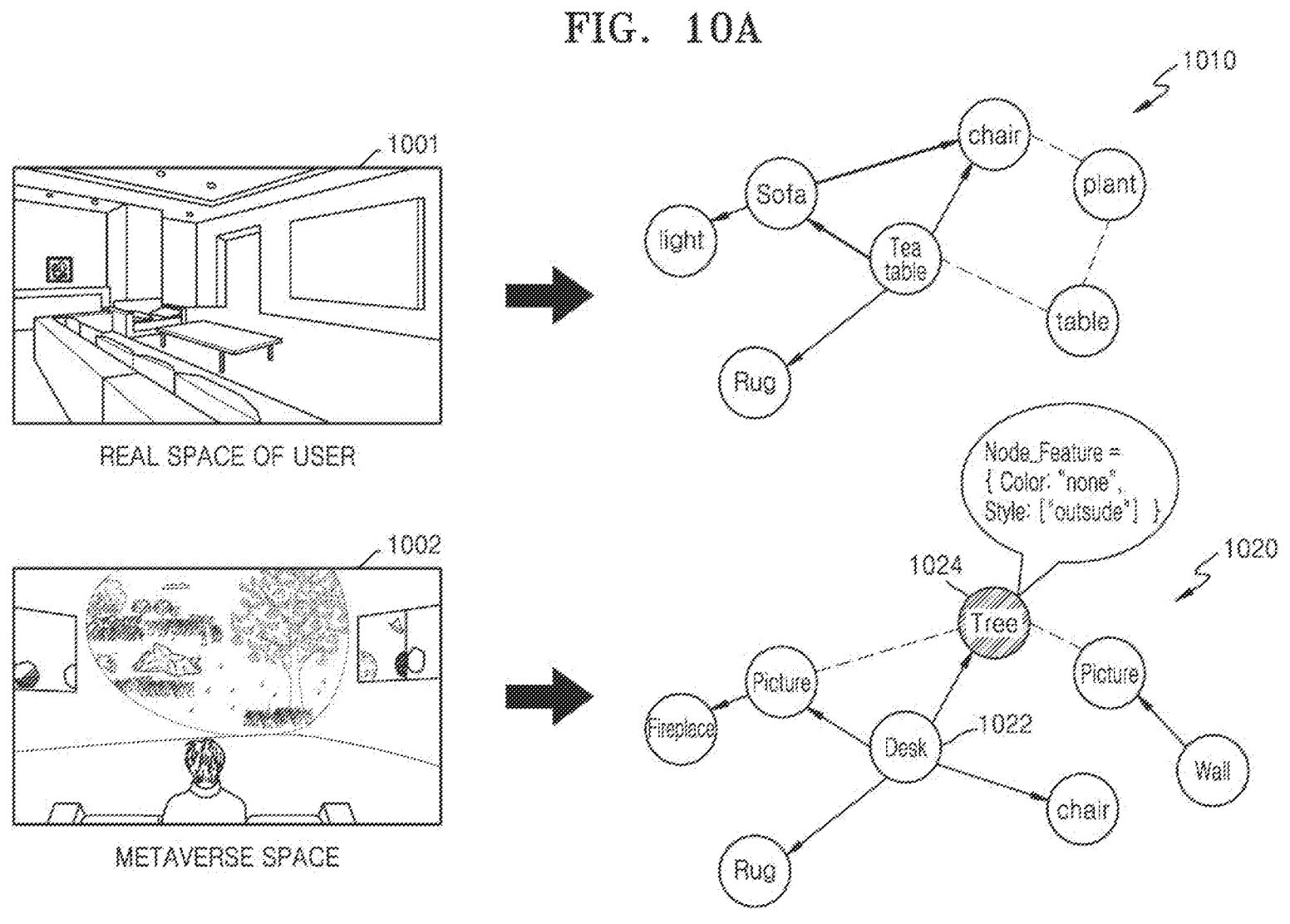

Tea table

Sofa light

Rug

1020

Wall

Picture chair

Tree

Node_Feature = { Color: "none", Style: ["outside"] }

1024

1022

Desk

Picture

Fireplace

Rug

1001

REAL SPACE OF USER

1002

METAVERSE SPACE

METHOD AND ELECTRONIC DEVICE FOR PROVIDING INFORMATION RELATED TO PLACING OBJECT IN SPACE

CROSS-REFERENCE TO RELATED APPLICATIONS

This application is a continuation application of International Application No. PCT/KR2023/013664, filed on Sep. 12, 2023, in the Korean Intellectual Property Office, which is based on and claims priority to Korean Patent Application No. 10-2022-0129030, filed on Oct. 7, 2022 and to Korean Patent Application No. 10-2022-0147412 filed on Nov. 7, 2022, the disclosures of each of the International Application and the Korean Patent Applications being incorporated by reference herein in their entireties.

BACKGROUND

1. Field

The disclosure relates to an electronic device for providing a user with information related to placement of an object in a space by using a spatial graph, and an operation method of the electronic device.

2. Description of Related Art

In many situations it is advantageous to be able to place home appliances/furniture in a space in a specific arrangement, but difficult to move bulky and heavy products in a real space. When placing a new home appliance/furniture in a space, it is difficult to actually try placing the home appliance/furniture in a real space, and thus, there is a difficulty in determining whether the new home appliance/furniture is suitable for the real space.

To address these issues, various technologies/techniques for placing an object in a virtual-reality/augmented-reality space have been developed. Algorithms are being used to provide information related to optimized object placement in a virtual-reality/augmented-reality space.

SUMMARY

In accordance with an aspect of the disclosure, a method, performed by an electronic device includes obtaining three-dimensional spatial data corresponding to a space and object-related data for a plurality of first objects in the space; obtaining a spatial graph comprising positional relations between the plurality of first objects in the space, based on the three-dimensional spatial data and the object-related data, the spatial graph comprising nodes corresponding to attributes of the plurality of first objects and edges representing the positional relations between the plurality of first objects; receiving a user input for changing an object placement in the space; based on the user input, adding, to the spatial graph, an empty node representing a second object to be placed in an empty region in the space in which the plurality of first objects are not placed; updating the spatial graph by applying, to a graph neural network (GNN), the spatial graph to which the empty node has been added; and outputting object placement change-related information for the space, based on the updated spatial graph.

In accordance with another aspect of the disclosure, an electronic device includes a display; a memory storing one or more instructions; and at least one processor configured to access the memory and execute the one or more instructions stored in the memory to at least obtain three-dimensional spatial data corresponding to a space and object-related data for a plurality of first objects in the space, obtain a spatial graph comprising positional relations between the plurality of first objects in the space, based on the three-dimensional spatial data and the object-related data, the spatial graph comprising nodes corresponding to attributes of the plurality of first objects and edges representing the positional relations between the plurality of first objects, receive a user input for changing an object placement in the space, based on the user input, add, to the spatial graph, an empty node representing a second object to be placed in an empty region in the space in which the plurality of first objects are not placed, update the spatial graph by applying, to a graph neural network (GNN), the spatial graph to which the empty node has been added, and output, through the display, object placement change-related information for the space based on the updated spatial graph.

In accordance with another aspect of the disclosure, a non-transitory computer-readable recording medium having recorded thereon computer code which, when executed by a computer, causes the computer to at least obtain three-dimensional spatial data corresponding to a space and object-related data for a plurality of first objects in the space; obtain a spatial graph comprising positional relations between the plurality of first objects in the space, based on the three-dimensional spatial data and the object-related data, the spatial graph comprising nodes corresponding to attributes of the plurality of first objects and edges representing the positional relations between the plurality of first objects; receive a user input for changing an object placement in the space; based on the user input, add, to the spatial graph, an empty node representing a second object to be placed in an empty region in the space in which the plurality of first objects are not placed; update the spatial graph by applying, to a graph neural network (GNN), the spatial graph to which the empty node has been added; and output object placement change-related information for the space, based on the updated spatial graph.

Additional aspects will be set forth in part in the description which follows and, in part, will be apparent from the description, or may be learned by practice of the presented embodiments.

BRIEF DESCRIPTION OF DRAWINGS

The above and other aspects, features, and advantages of certain embodiments of the present disclosure will be more apparent from the following description taken in conjunction with the accompanying drawings, in which:

FIG. 1 is a diagram schematically illustrating an operation of an electronic device for providing information related to placing an object in a space, according to some embodiments;

FIG. 3B is a diagram illustrating an operation, performed by an electronic device, of generating a spatial graph, according to some embodiments;

FIG. 6A is a diagram illustrating an operation, performed by an electronic device, of performing inference by using a graph neural network, according to some embodiments;

FIG. 9B is a diagram illustrating an operation, performed by an electronic device, of outputting personalized recommendation information about a change in object placement in a space, based on a personalized spatial graph, according to some embodiments;

FIG. 10A is a diagram illustrating an operation, performed by an electronic device, of generating a metaverse spatial graph, according to some embodiments;

DETAILED DESCRIPTION

Figure 2:
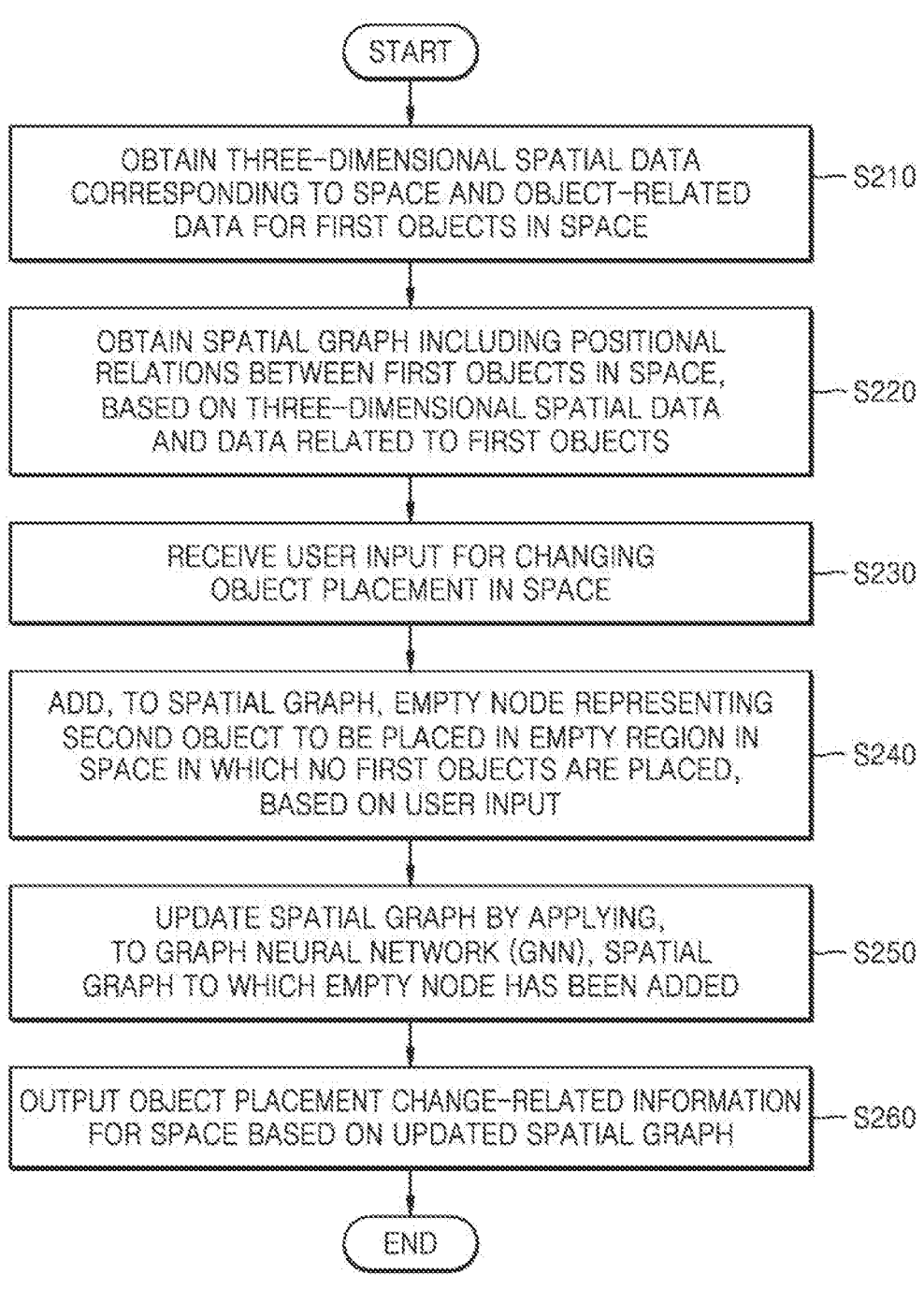
FIG. 2 is a flowchart illustrating a method, performed by an electronic device, of providing information related to placing an object in a space, according to some embodiments.

Throughout the disclosure, the expression "at least one of a, b, or c" may indicate only a, only b, only c, both a and b, both a and c, both b and c, all of a, b, and c, or variations thereof.

Although the terms used herein are selected from among common terms that are currently widely used in consideration of their functions in the disclosure, the terms may be different according to an intention of one of ordinary skill in the art, a precedent, or the advent of new technology. In addition, in certain cases, there are also terms arbitrarily selected by the applicant, and in this case, the meaning thereof will be defined in detail in the description. Therefore, the terms used herein are not merely designations of the terms, but the terms are defined based on the meaning of the terms and content throughout the disclosure.

The singular expression may also include the plural meaning as long as the plural meaning is not inconsistent with the context. All the terms used herein, including technical and scientific terms, may have the same meanings as those generally understood by those of skill in the art. In addition, although the terms such as 'first' or 'second' may be used in the present specification to describe various elements, these elements should not be limited by these terms. These terms are only used to distinguish one element from another element.

Throughout the specification, when a part "includes" a component, the term "includes" means that the part may additionally include other components rather than excluding other components as long as there is no particular opposing recitation. In addition, as used herein, the terms such as " . . . er (or)", " . . . unit", " . . . module", etc., denote a unit that performs at least one function or operation, which may be implemented as hardware or software or a combination thereof.

Hereinafter, some embodiments will be described in detail with reference to the accompanying drawings to allow those of skill in the art to easily carry out the embodiments of the disclosure. The disclosure may, however, be embodied in many different forms and should not be construed as being limited to some embodiments set forth herein. In addition, in order to clearly describe the disclosure, portions that are not relevant to the description of the disclosure are omitted, and similar reference numerals are assigned to similar elements throughout the specification. In addition, reference numerals used in each drawing are only for describing the drawing, and different reference numerals used in different drawings are not for indicating different elements. Hereinafter, the disclosure will be described in detail with reference to the accompanying drawings.

Figure 1:
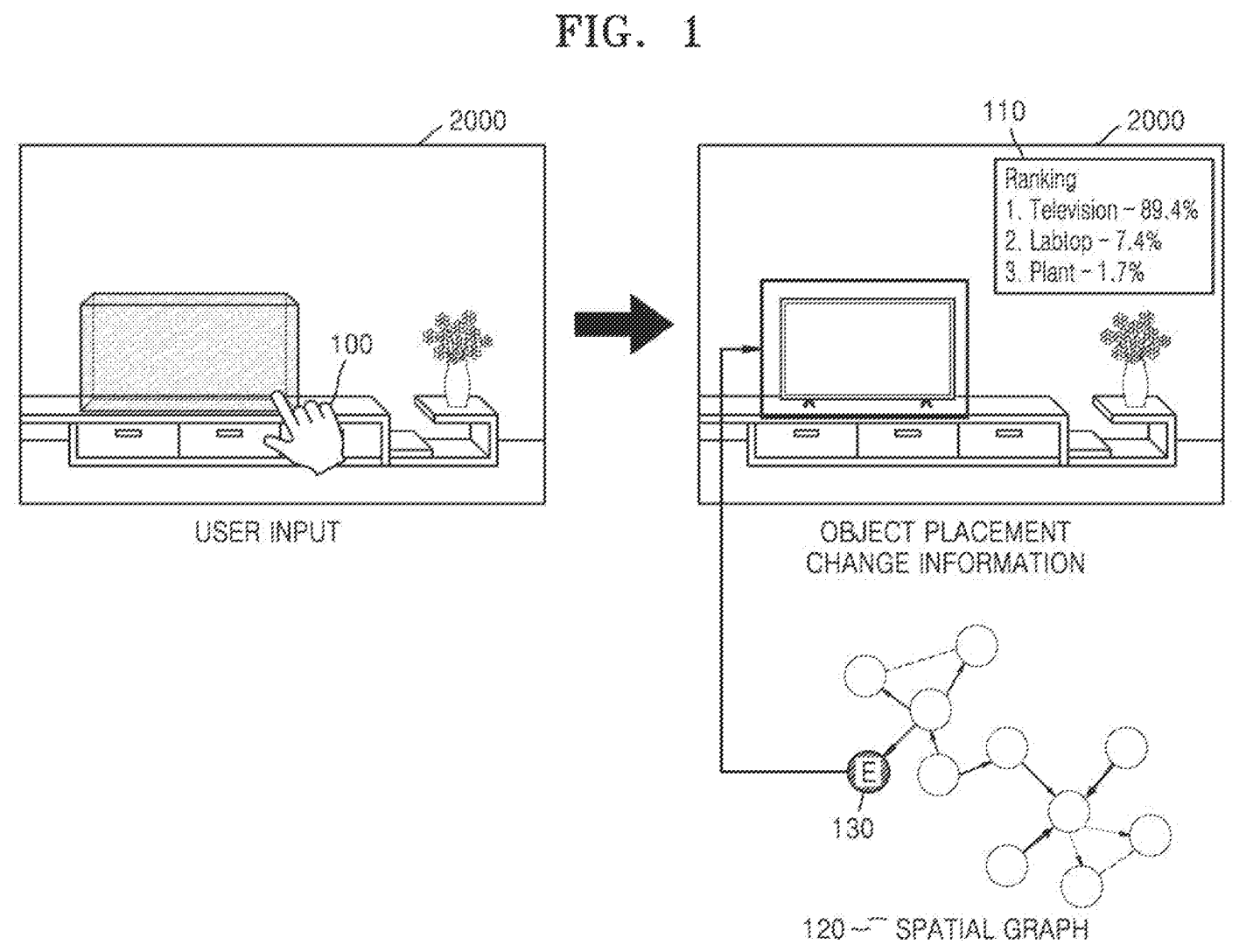

FIG. 1 is a diagram schematically illustrating an operation of an electronic device for providing information related to placing an object in a space, according to some embodiments.

In some embodiments, an electronic device 2000 may be a device including a display. For example, the electronic device 2000 may include, but is not limited to, a smart phone, a head-mounted display (e.g., an augmented reality (AR) or virtual-reality (VR) device), a smart television (TV), a tablet personal computer (PC), a laptop computer, and the like. The electronic device 2000 may be implemented as a device without a display (e.g., a desktop computer) and connectable to a display device (e.g., a monitor).

In the disclosure, a 'space' refers to a real space. The space may include, for example, a room, a living room, a study, an office, and the like. In the disclosure, a 'virtual space' refers to a space implemented to correspond to a real space. That is, a virtual space in the disclosure is a virtual environment obtained by implementing a real space, and may be a result of reducing or enlarging the real space at a same/similar ratio considering the layout of the real space. As used herein, a 'metaverse space' is the same as the above-described virtual space in that it implements a virtual environment, but unlike the above-mentioned virtual space, the term 'metaverse space' refers to a space in which a separate virtual world different from real spaces is implemented as a virtual environment.

In some embodiments, the electronic device 2000 may display a virtual space corresponding to a real space on a screen. The virtual space may be a virtual environment obtained by implementing a real space of a user (hereinafter, referred to as a 'space'). In order to change the placement of an object in the space, the user may try changing the placement of the object in the virtual space by using the electronic device 2000. For example, the user of the electronic device 2000 may input an object to the electronic device 2000 to receive a recommendation for a position where the object is to be placed, or input a position to receive a recommendation for an object to be placed at the position. In a case in which the electronic device 2000 is capable of providing an AR mode, the electronic device 2000 may provide the AR mode in which a virtual object and the like is displayed and overlaid on a real space. In the disclosure, the virtual space is described as an example for convenience of description, but various embodiments may be equally applied to an AR space.

Referring to FIG. 1, the electronic device 2000 may receive, from the user, a user input 100 for selecting an empty region in the virtual space.

The electronic device 2000 may perform computations for object placement based on the user input and output object placement change-related information 110. For example, because the user has selected the empty region in the virtual space, information for recommending an object to be placed in the empty region may be output as the object placement change-related information 110.

The electronic device 2000 may use a spatial graph 120 and a graph neural network (GNN) to provide the object placement change-related information 110. The spatial graph 120 may include nodes and edges. The nodes may correspond to objects (hereinafter, also referred to as 'first objects') existing in the space, and the edges may represent positional relations between the objects existing in the space. For example, in the spatial graph 120, the nodes may be illustrated as circles and the edges as the lines between the circles.

The user of the electronic device 2000 may place a new object (hereinafter, also referred to as a 'second object') in the virtual space. Because the nodes of the spatial graph 120 correspond to the objects in the space, the electronic device 2000 may generate a new node 130 corresponding to the new object and add the new node 130 to the spatial graph 120. The new node 130 may be an empty node that includes only position information, and object feature vectors related to object attributes in the node may not yet be determined.

The electronic device 2000 may apply, to the graph neural network (GNN), the spatial graph 120 to which the new node 130 has been added. The graph neural network may be pre-trained. When the spatial graph 120 to which the new node 130 has been added is applied to the graph neural network (GNN), feature vectors of the new node 130 may be determined based on existing nodes and edges included in the spatial graph 120 (this process is also referred to as 'node embedding'). The electronic device 2000 may output the object placement change-related information 110 related to the new object to be placed in the virtual space (e.g., a position where a new object is to be placed, a new object to be placed at a designated position, etc.), based on the feature vectors embedded in the new node 130.

Detailed operations, performed by the electronic device 2000, of processing object placement in the virtual environment by using the spatial graph 120 and the graph neural network (GNN) and providing the user with object placement change-related information for the space will be described below with reference to the corresponding drawings.

FIG. 2 is a flowchart illustrating a method, performed by an electronic device, of providing information related to placing an object in a space, according to some embodiments.

In describing FIG. 2, in order to distinguish between objects currently existing in the space and a new object to be placed, the objects currently existing in the space will be referred to as first objects and the new object will be referred to as a second object. In addition, in the description that follows, when describing objects that do not require distinguishing between first objects and second objects, the ordinal numbers 'first' and 'second' will be omitted.

In operation S210, the electronic device 2000 obtains three-dimensional spatial data corresponding to the space and object-related data for the first objects in the space. For example, the space may have a plurality of first objects existing in the space.

In some embodiments, the electronic device 2000 may obtain three-dimensional spatial data. For example, the electronic device 2000 may obtain three-dimensional spatial data including a three-dimensional space image obtained by using a camera to three-dimensionally scan the space. The three-dimensional spatial data may include, but is not limited to, a three-dimensional image of the space, a layout of the space, the size (e.g., the width, length, and height) of the space, the positions of one or more objects in the space, and the size of the one or more objects in the space.

In some embodiments, the electronic device 2000 may obtain the object-related data for the first objects in the space. The object-related data may include, but is not limited to, the position of an object in the space, the size of the object in the space, the type of the object, identification information of the object, an orientation of the object, and the like.

In operation S220, the electronic device 2000 obtains a spatial graph including positional relations between the first objects in the space, based on the three-dimensional spatial data and the object-related data for the first objects.

In some embodiments, the spatial graph may include nodes corresponding to attributes of the first objects and edges representing the positional relations between the first objects.

The nodes of the spatial graph may include object feature vectors representing object attributes. The object feature vectors representing the object attributes may include various features related to the objects, such as the positions, sizes, categories, colors, or styles of the objects. The nodes of the spatial graph may include feature vectors related to the type (e.g., room) of the space and a layout (e.g., a wall) of the space.

The edges of the spatial graph may be an adjacency matrix representing positional relations between adjacent objects. The positional relations may be defined as various types related to positional relations between objects, for example, a 'co-occurring' positional relation, a 'supporting' positional relation, a 'supported-by' positional relation, a 'surrounding' positional relation, a 'surrounded-by' positional relation, a 'next-to' positional relation, and the like. Meanwhile, it has been exemplarily described, for convenience of description, that a spatial graph may be defined with vectors and an adjacency matrix, but this is only an example, and a data format representing a spatial graph is not limited to the above-described example.

In operation S230, the electronic device 2000 receives a user input for changing object placement in the space.

In some embodiments, the user input for changing the object placement in the space may be an input corresponding to 'a position in the space where an object is to be placed' (hereinafter, referred to as a position input). The position input may be received in various manners.

In some embodiments, the electronic device 2000 may generate a virtual space corresponding to the space and display the virtual space on the screen. In this case, the virtual space may be generated based on the three-dimensional spatial data and the object-related data, and may refer to data that may be visually provided to the user by rendering a layout of a real space and objects in the space in the same configuration as the real space into a virtual space. The electronic device 2000 may display the virtual space on the screen and receive a user input for designating a particular position in the space from the user viewing the virtual space on the screen. In detail, the electronic device 2000 may receive a user input for selecting one or more positions in an empty region in which no objects are placed.

In some embodiments, the electronic device 2000 may receive a natural language input from the user. The natural language input may be text data or voice data, and may be analyzed by using a natural language processing (NLP) model. In this case, when voice data is received, an automatic speech recognition (ASR) model may be used. For example, when the natural-language input is 'next to a TV', the electronic device 2000 may perform semantic analysis on the natural language input by using an NLP model, and identify the coordinates of an available empty region next to the TV, the size of the empty region, and the like in the space based on the three-dimensional spatial data and the object-related data.

In some embodiments, the electronic device 2000 may receive, from the user, raw data related to a position. For example, the electronic device 2000 may receive, from the user, a user input representing the coordinates of a particular position in the space, the size of the position, and the like.

Position inputs received in various manners may be converted into data for updating the spatial graph. For example, the position input may be converted into the coordinates of the position, the size (e.g., the width, length, and height) of the position, and the like, but the disclosure is not limited thereto.

In some embodiments, the user input for changing object placement in the space may be an input corresponding to 'an object to be placed in the space'. The input corresponding to 'the object to be placed in the space' (hereinafter, referred to as an object input) may be an input for selecting a particular object in order for the user to request a recommendation for a position in the space where the particular object is to be placed, but is not limited thereto, and may be received in various manners. The object input may include, for example, an input of an object category (e.g., TV), an input of object identification information (e.g., a TV model name), a natural language input (e.g., 'Recommend a position for placing a TV'), and the like, but is not limited thereto. Detailed methods, performed by the electronic device 2000, of receiving an object input are the same as the example of the above-described position input, and thus, descriptions thereof will be omitted.

Object inputs received in various manners may be converted into data for updating the spatial graph. For example, the object input may be converted into an object category, an object size, and the like, but the disclosure is not limited thereto.

In operation S240, the electronic device 2000 adds, to the spatial graph, an empty node representing a second object to be placed in an empty region in the space in which no first objects are placed, based on the user input. The empty node is a node representing the second object to be newly placed in the space, but is in a state in which the second object is not yet determined. That is, object feature vectors of the empty node representing object attributes may not be determined yet.

In some embodiments, the type of the user input received in operation S230 may be a position input. In this case, the electronic device 2000 may determine a position in the spatial graph to which the empty node has been added, based on position information of the position input (e.g., coordinates in the position input, a size in the position input, etc.). The nodes of the spatial graph may include the coordinates of objects and the sizes of the objects. For example, based on a position input 'first position (x, y, z)', the electronic device 2000 may identify at least one first object $(x_1, y_1, z_1)$ within a certain distance from the first position. In detail, when the position input corresponds to a position on a table in the space, the electronic device 2000 may identify the table, which is a first object below the position, based on the position information.

In this case, the electronic device 2000 may add an empty node representing the second object to be adjacent to at least one node corresponding to a first object within a certain distance from the first position.

In some embodiments, the type of the user input received in operation S230 may be an object input. In this case, the electronic device 2000 may add one or more empty node candidates to the spatial graph. As an example, three empty node candidates may be added for one object input, and in this case, a spatial graph to which a first empty node candidate has been added, a spatial graph to which a second empty node candidate has been added, and a spatial graph to which a third empty node candidate has been added may be generated.

In this case, the electronic device 2000 may determine a position in the spatial graph to which one or more empty node candidates are to be added, based on position information (e.g., the positions of the first objects, the sizes of the first objects, etc.) of the nodes in the spatial graph. For example, in some embodiments, the one or more empty node candidates may be added to a position in the spatial graph corresponding to an empty region in the space. In some embodiments, based on the size of the second object, which is an object input, the one or more empty node candidates may be added to a position corresponding to an empty region having a size in which the second object may be placed, among empty regions in the space. That is, the one or more empty node candidates may be added to a position corresponding to an empty node region where position has a size sufficient to accommodate placement of the second object, among empty regions in the space.

When the empty node representing the second object is added in operation S240, an edge representing a connection relation with a node corresponding to a neighboring first object may be determined. In this case, the type of the edge represents a positional relation between the objects. For example, in some embodiments, the type of the edge may be determined in a rule-based manner, based on position information of the empty node when the empty node is added. In some embodiments, the type of the edge may be determined by a user input. In some embodiments, the type of the edge may be predicted by a graph neural network (GNN) in operation S250 to be described below.

In operation S250, the electronic device 2000 updates the spatial graph by applying, to the GNN, the spatial graph to which the empty node has been added.

In some embodiments, the electronic device 2000 may infer object feature vectors of the empty node in the spatial graph by using the GNN. In some embodiments, the electronic device 2000 may predict an edge to be connected to the empty node. Edge prediction may include, for example, whether an edge is connected and/or the type of the edge.

In some embodiments, when the type of the user input received in operation S230 is a position input, the electronic device 2000 may infer object feature vectors of the empty node by using the GNN (this process is also referred to as 'node embedding'). When object feature vectors are embedded in the empty node, the empty node may be referred to as a vector-embedded node. The spatial graph including the vector-embedded node may be referred to as an updated spatial graph. The object feature vectors filled in the empty node as a result of node embedding are determined based on attributes of the first objects. For example, based on various object-related features such as the positions, sizes, categories, colors, and styles of the first objects, the empty node may be filled with feature vectors related to various object features related to the objects, such as the positions, sizes, categories, colors, and styles of the objects.

In some embodiments, when the type of the user input received in operation S230 is an object input, the electronic device 2000 may infer object feature vectors of the one or more empty node candidates by using the GNN. When a plurality of empty node candidates are generated, object feature vectors may be embedded in each of the plurality of empty node candidates. The object feature vectors filled in each of the empty node candidates as a result of node embedding are determined based on attributes of the first objects. For example, based on various object-related features such as the positions, sizes, categories, colors, and styles of the first objects, the empty node may be filled with feature vectors related to various object features related to the objects, such as the positions, sizes, categories, colors, and styles of the objects.

The electronic device 2000 may select one or more of the vector-embedded node candidates based on the object feature vectors of the vector-embedded node candidates. In an example, embedding may be performed on a first empty node candidate in a spatial graph including the first empty node candidate, embedding may be performed on a second empty node candidate in a spatial graph including the second empty node candidate, and embedding may be performed on a third empty node candidate in a spatial graph including the third empty node candidate. In this case, the first empty node candidate and the second empty node candidate may be selected. However, although it is described above that an empty node candidate is selected, the selected node is a node in which object feature vectors are embedded, that is, a first vector-embedded node and a second vector-embedded node may be selected. The spatial graph including the selected vector-embedded node may be referred to as an updated spatial graph.

In operation S260, the electronic device 2000 outputs object placement change-related information for the space based on the updated spatial graph.

The electronic device 2000 may output the object placement change-related information of the space based on the object feature vectors in the vector-embedded node of the updated spatial graph.

In some embodiments, when the type of the user input received in operation S230 is a position input, the electronic device 2000 may determine and output one or more object categories corresponding to second objects that may be placed at the input position. In detail, the electronic device 2000 may output 'object A, object B, object C, etc.', which may be placed at the input position.

In some embodiments, when the type of the user input received in operation S240 is an object input, the electronic device 2000 may determine and output one or more positions where the input second object is to be placed. In detail, the electronic device 2000 may output positions 'position A, position B, position C, etc.' where the input object may be placed.

Figure 3A:
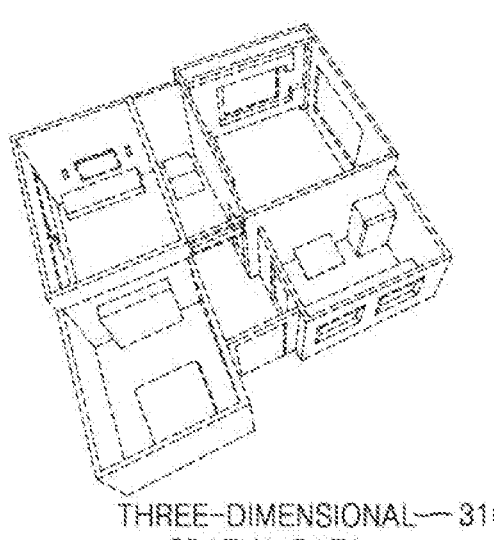
FIG. 3A is a diagram illustrating an operation, performed by an electronic device, of obtaining data used for generating a spatial graph, according to some embodiments.
Figure 3A:
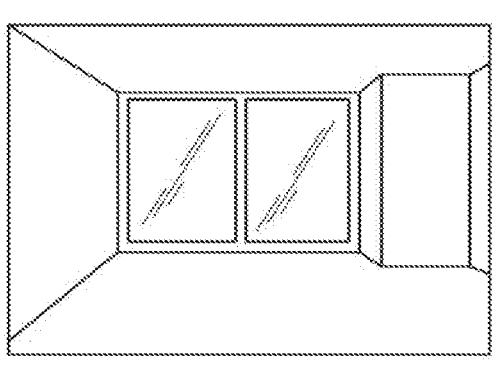
Figure 3A:
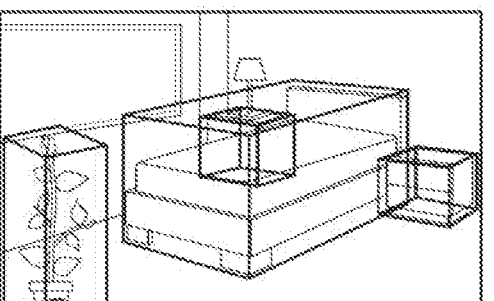

FIG. 3A is a diagram illustrating an operation, performed by an electronic device, of obtaining data used for generating a spatial graph, according to some embodiments.

The three-dimensional spatial data may include, but is not limited to, a three-dimensional image of a space, a layout of the space, the size (e.g., the width, length, and height) of the space, the positions of one or more objects in the space, and the size of the one or more objects in the space.

In some embodiments, the electronic device 2000 may perform a three-dimensional scan of the space, under control by a user. In some embodiments, the electronic device 2000 may perform the three-dimensional scan of the space, under control of a processor. In this case, the electronic device 2000 may include one or more sensors for three-dimensional scanning. For example, the one or more sensors may use, but is not limited to, a red-green-blue (RGB)-depth (RGB-D) sensor, a time-of-flight (ToF) sensor, a light detection and ranging (LiDAR) sensor, a radio detection and ranging (RADAR) sensor, and the like. The electronic device 2000 may generate three-dimensional spatial data 310 based on sensor data obtained through the three-dimensional scan.

In some embodiments, the three-dimensional spatial data 310 may be received from an external device (e.g., a server or other electronic device). For example, the three-dimensional spatial data 310 obtained by another electronic device (e.g., a robot cleaner) performing a three-dimensional scan on the space may be received by the electronic device 2000. For example, the electronic device 2000 may receive the three-dimensional spatial data 310 obtained by a three-dimensional precision measurement instrument (e.g., a LiDAR scanner). For example, in some embodiments, pre-stored three-dimensional spatial data 310 may be received from a server. In some embodiments, the three-dimensional spatial data 310 may be obtained by receiving a direct input of dimensions of the space. In this case, accurate three-dimensional spatial data 310 based on actual measurement of the space by the user may be received by the electronic device 2000.

Object-related data 320 may include, but is not limited to, the position of an object in the space, the size of the object in the space, the type of the object, identification information of the object, an orientation of the object, and the like.

In some embodiments, the electronic device 2000 may generate the object-related data 320 based on the three-dimensional spatial data 310.

In some embodiments, the electronic device 2000 may obtain the position and size of an object by performing a three-dimensional scan of the space. In some embodiments, the electronic device 2000 may obtain the position and size of an object by detecting one or more objects in the space from a three-dimensional image of the space. In this case, an object detection model, which is an artificial intelligence model for detecting an object in a space, may be used. In some embodiments, the electronic device 2000 may combine the position and size of the object obtained from the three-dimensional scan of the space and the position with size of the object obtained by using the object detection model.

The electronic device 2000 may obtain the type of an object and identification information of the object by recognizing one or more objects in a three-dimensional image (or a two-dimensional image) of the space. In this case, an object recognition model, which is an artificial intelligence model for recognizing an object in a space, may be used. The object recognition model may include an algorithm of the object detection model described above for detecting the position, size, and the like of an object, and accordingly, may also output an object detection result.

In some embodiments, the object-related data 320 may be received from an external device. For example, the electronic device 2000 may receive, as the object-related data 320, pre-stored information of objects in the space, from a server. For example, in some embodiments, the electronic device 2000 may receive, from another electronic device, the object-related data 320 obtained by the other electronic device detecting/recognizing an object. In some embodiments, the object-related data 320 may be obtained by receiving a direct input of dimensions of the object. In this case, accurate object-related data 320 based on actual object measurement by the user may be received by the electronic device 2000.

The methods, performed by the electronic device 2000, of obtaining the three-dimensional spatial data 310 and the object-related data 320 are not limited to the above examples. For example, in some embodiments, two or more of the methods of obtaining the three-dimensional spatial data 310 and the object-related data 320 according to the above-described examples may be used complementarily to each other, and accordingly, accurate three-dimensional spatial data 310 and object-related data 320 may be obtained.

FIG. 3B is a diagram illustrating an operation, performed by an electronic device, of generating a spatial graph, according to some embodiments.

In some embodiments, the electronic device 2000 may generate a spatial graph 330 by using the three-dimensional spatial data 310 and the object-related data 320. In this case, based on the three-dimensional spatial data 310 and the object-related data 320, feature vectors of nodes representing object attributes may be determined, and edges representing object connection relations may be determined. In this case, a graph generation model, which is an artificial intelligence model for generating the spatial graph 330, may be used.

In some embodiments, the electronic device 2000 may receive, from an external device (e.g., a server), the spatial graph 330 defining objects in a space and positional relations between the objects. In this case, the spatial graph received from the external device may be generated by using the spatial data 310 and the object-related data 320.

In some embodiments, the electronic device 2000 may generate or update the spatial graph 330. For example, in some embodiments, the electronic device 2000 may generate or update the spatial graph 330 based on a user input. For example, the electronic device 2000 may receive a user input and generate the spatial graph 330 including nodes representing objects and edges representing positional relations between the objects. In some embodiments, the electronic device 2000 may receive a user input and modify nodes and/or edges of the generated spatial graph 330 based on the received user input.

Figure 4A:
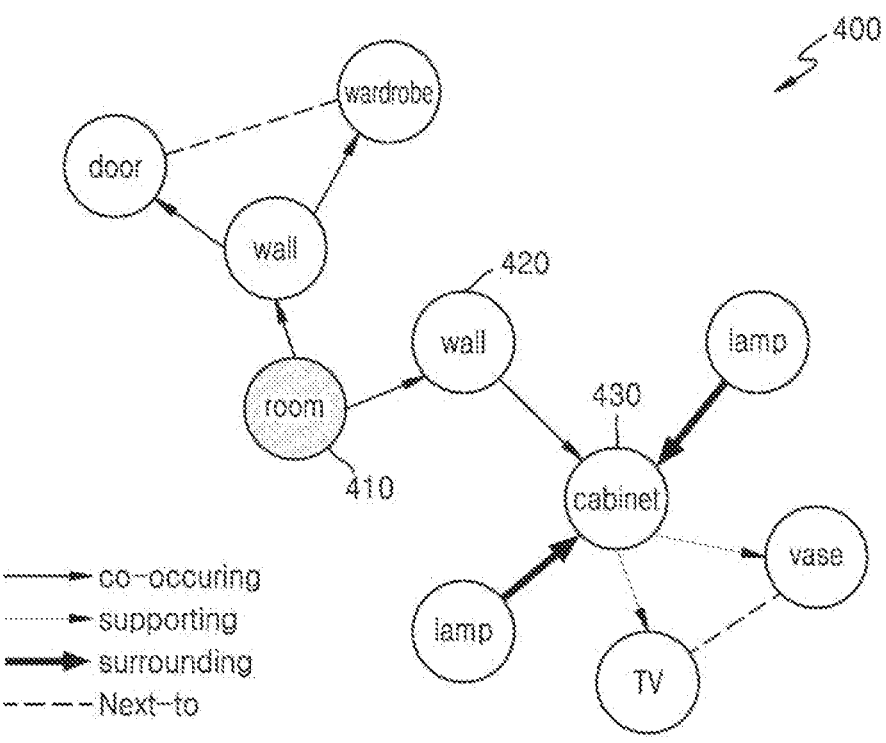
FIG. 4A is a diagram illustrating a spatial graph according to some embodiments.

FIG. 4A is a diagram illustrating a spatial graph according to some embodiments.

FIG. 4A visually depicts a spatial graph 400. Nodes of the spatial graph may be data including feature vectors, and edges of the spatial graph may be data represented by an adjacency matrix. In some embodiments, nodes of the spatial graph may be data consisting of feature vectors, and edges of the spatial graph may be data represented by an adjacency matrix. However, embodiments are not limited thereto. The spatial graph 400 illustrated in FIG. 4A may be an initial graph, and may be updated as a final graph by a GNN. This process will be further described below with reference to FIG. 4C.

In some embodiments, the nodes of the spatial graph 400 may correspond to the type of the space, a layout of a space, or objects existing in a space. Hereinafter, a first node 410, a second node 420, and a third node 430 will be described as examples.

The first node 410 may be a node corresponding to the type of the space, 'room'. In this case, the first node 410 may include spatial feature vectors related to the type of the space. The spatial feature vectors related to the type of the space may include, for example, the type of the space, a main object in the space, the style of the space, the color of the space, and the like, but are not limited thereto.

The second node 420 may be a node corresponding to a layout of the space, 'wall'. In this case, the second node 420 may include spatial feature vectors related to the layout of the space. The spatial feature vectors related to the layout of the space may include, for example, the style of the layout, the color of the layout, the presence or absence of a door, the presence or absence of a wall socket, and the like, but are not limited thereto.

The third node 430 may be a node corresponding to a 'cabinet', which is an object existing in the space (also referred to as a first object). In this case, the third node 430 may include object feature vectors related to attributes of the object. The object feature vectors may include, for example, the position of the object, the size of the object, the category of the object, the color of the object, the style of the object, and the like, but are not limited thereto.

In some embodiments, the edges of the spatial graph 400 may represent positional relations between adjacent objects and/or layouts in the space. The positional relations may be defined as various types related to positional relations between objects, for example, a 'co-occurring' positional relation, a 'supporting' positional relation, a 'supported-by' positional relation, a 'surrounding' positional relation, a 'surrounded-by' positional relation, a 'next-to' positional relation, and the like.

Detailed and exemplary definitions of the positional relations are as follows:

'Supporting' positional relation: When an object is placed on another object, the lower object is defined as supporting the higher object. For example, in a case of 'table→vase', the table is positioned to support the vase, and thus, an edge from the table to the vase is defined as a type 'supporting'.

'Supported-by' positional relation: When an object is positioned below another object, the higher object is defined as being supported by the lower object. For example, in a case of 'vase→table', the vase is positioned to be supported by the table, and thus, an edge from the vase to the table is defined as a type 'supported-by'.

'Surrounding' positional relation: When objects having the same or similar size are positioned to surround a central object, the peripheral objects are defined as surrounding the central object. For example, in a case of 'lamp A→bed←lamp B', the lamps are positioned to surround the bed, and thus, an edge from each of the lamps to the bed is defined as a type 'surrounding'.

'Surrounded-by' positional relation: When a central object is positioned to be surrounded by objects having the same or similar size, the central object is defined as being surrounded by the peripheral objects. For example, in a case of 'lamp A←bed→lamp B', the bed is positioned to be surrounded by the lamps, and thus, an edge from the bed to each of the lamps is defined as a type 'surrounded-by'.

'Next-to' positional relation: When two objects at the same or similar height are adjacent to each other within a certain distance, the two objects are defined as being next to each other. An edge between the two objects may be undirected. For example, in a case of 'vase-TV', the vase and the TV are adjacent to each other, and thus, an edge connecting the vase to the TV is defined as a type 'next-to'.

'Co-occurring' positional relation: All objects existing in the same room are defined as co-occurring. However, the 'co-occurring' positional relation has the lowest priority and objects that do not correspond to the above-described positional relations are indicated as co-occurring. For example, in a spatial graph corresponding to the room, a directed edge of 'room→wall→object' is generated, and the type of the edge is defined as a type 'co-occurring'.

Hereinafter, positional relations between the first node 410, the second node 420, and the third node 430 will be described as an additional example.

For example, a room requires the presence of a wall, and thus, the first node 410 corresponding to the room may be defined as being in the 'co-occurring' positional relation with the second node 420 corresponding to the wall.

For example, the cabinet is placed in direct contact with the wall, and thus, the second node 420 corresponding to the wall and the third node 430 corresponding to the cabinet may be defined as being in the 'co-occurring' positional relation.

However, the above-described positional relations are only examples, and edges may connect the nodes differently from the spatial graph 400 illustrated in FIG. 4A. For example, the second node 420 corresponding to the wall and the third node 430 corresponding to the cabinet may be defined as being in the 'next-to' positional relation.

Nodes corresponding to the objects around the cabinet (e.g., the lamp, the vase, and the TV) may be connected to the third node 430 corresponding to the cabinet through edges. In this case, the types of the edges may be determined according to the positional relations between the objects.

Figure 4B:
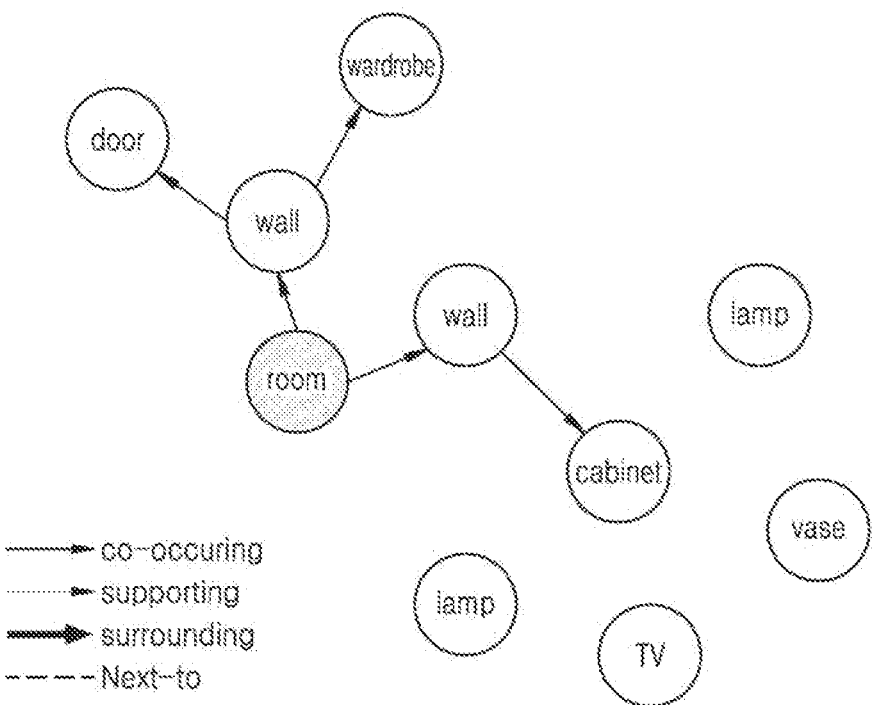
FIG. 4B is a diagram illustrating types of spatial graphs according to some embodiments.

FIG. 4B is a diagram illustrating types of spatial graphs according to some embodiments.

In some embodiments, the spatial graph 400 may be distinguished into a plurality of types of spatial graphs. Each of the plurality of types of spatial graphs may correspond to each of the plurality of types of positional relations described above with reference to FIG. 4A.

FIG. 4B illustrates a spatial graph corresponding to the 'co-occurring' positional relation. In this case, edges connecting the nodes represent the 'co-occurring' positional relation. For example, for a space whose type of room, a wall, a wardrobe, a cabinet, and the like may be defined as being in the 'co-occurring' relation with each other.

Although FIG. 4B illustrates only the spatial graph corresponding to the 'co-occurring' positional relation, there may be other types of spatial graphs corresponding to the above-described positional relations.

In some embodiments, the spatial graph 400 may be a combination of a plurality of types of spatial graphs. In this case, edges representing all types of positional relations may be included in one spatial graph 400. In a case in which a plurality of types of edges are included in one spatial graph 400, each type of edge may be identified by using an index or the like.

Figure 4C:
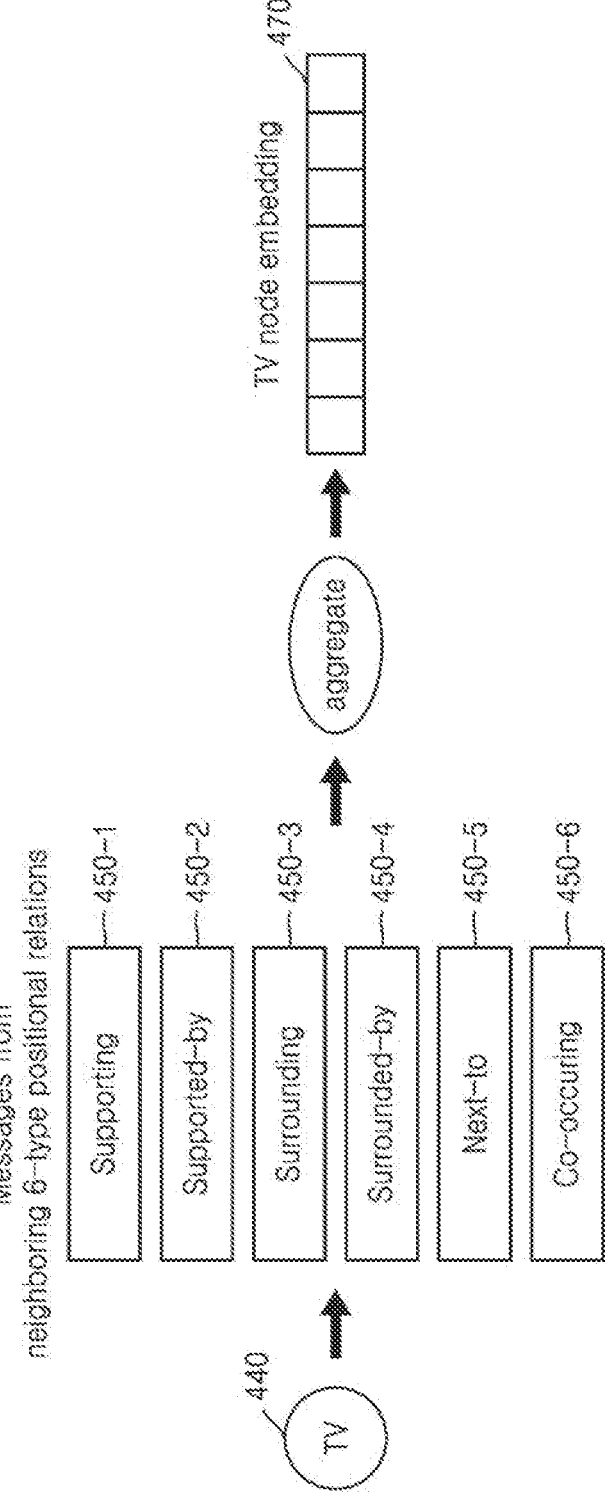
FIG. 4C is a diagram illustrating an operation, performed by an electronic device, of training a spatial graph by using a graph neural network, according to some embodiments.

FIG. 4C is a diagram illustrating an operation, performed by an electronic device, of training a spatial graph by using a GNN, according to some embodiments.

In some embodiments, the electronic device 2000 may train the spatial graph 400 by applying the spatial graph 400 to a graph neural network (GNN). The GNN may update the state of each node by using edges representing connection relations between the nodes, and the states of neighboring nodes. Here, the final state of the node after the updating may be referred to as a node embedding.

An example in which node embedding is performed on a TV node 440, which is one of the nodes of the spatial graph 400, will be described with reference to FIG. 4C. Node embedding for the TV node 440 may be equally applied to other nodes of the spatial graph 400, and thus, redundant descriptions will be omitted for conciseness.

In some embodiments, the TV node 440 may receive messages from neighboring nodes. As examples of the messages, in a case in which w nodes are adjacent to a v node, messages received by the v node refer to information generated based on a hidden state and a feature vector of the v node, and hidden states and feature vectors of the w nodes are aggregated and then delivered to the v node. That is, the messages are a function defined to include, as variables, the hidden state and the feature vector of the v node and the hidden states and the feature vectors of the w nodes.

For example, node A and node B may be adjacent to the TV node 440. In this case, the TV node 440 may receive a message from node A and a message from node B. In this case, node A delivers messages to the TV node 440 based on an aggregate of messages from other nodes adjacent to node A, and node B delivers messages to the TV node 440 based on an aggregate of messages from other nodes adjacent to node B.

In some embodiments, as described above with reference to FIG. 4B, the spatial graph 400 may include a plurality of types of spatial graphs. In this case, a message may be received from each type of spatial graph.

For example, in a 'supporting'-type spatial graph 450-1, a message may be received by the TV node 440. In this case, when messages are aggregated and then delivered to neighboring nodes in the 'supporting'-type spatial graph 450-1, there may be nodes with no edges connected thereto in the 'supporting'-type spatial graph 450-1 (see FIG. 4B illustrating an example of a 'co-occurring'-type spatial graph). In this case, for the nodes with no edges connected thereto, messages may be delivered to the TV node 440 by using connection relations of the spatial graph 400 of FIG. 4A.

In the same manner, in each of a 'supported-by'-type spatial graph 450-2, a 'surrounding'-type spatial graph 450-3, a 'surrounded-by'-type spatial graph 450-4, a 'next-to'-type spatial graph 450-5, and a 'co-occurring'-type spatial graph 450-6, a message reflecting the positional relation of each type may be delivered to the TV node 440.

In some embodiments, the GNN may aggregate the messages delivered to the TV node 440. For such message aggregation, the GNN may include a convolutional layer, but is not limited thereto.

The GNN may aggregate the messages delivered to the TV node 440, and based on a result of concatenating the aggregated messages, update the state of the TV node 440 from the current state to the next state (e.g., from t to t+1). For such an update, the GNN may include a multi-layer perceptron (MLP), but is not limited thereto. An update function for the v node may be defined to include, as variables, a hidden state (t) of the v node and the message received by the v node, and the v node may be updated to a next hidden state (t+1) by the update function. That is, based on the current state of the TV node 440 and the messages received by the TV node 440, the TV node 440 may be updated to the next state.

In some embodiments, final feature vectors of the TV node 440 may be filled by iterating the above-described update. This iterating is referred to as TV node embedding 470.

When the electronic device 2000 applies the spatial graph 400 to the GNN, each node in the spatial graph 400 is embedded, as in the example of the TV node embedding 470.

When the electronic device 2000 trains the spatial graph 400 by using the GNN such that embedding is performed on all nodes in the spatial graph 400, then adds a new node to the trained spatial graph and applies the spatial graph to the GNN, the newly added node and edges may be inferred. This operation will be described below with reference to the corresponding drawings.

Figure 5:
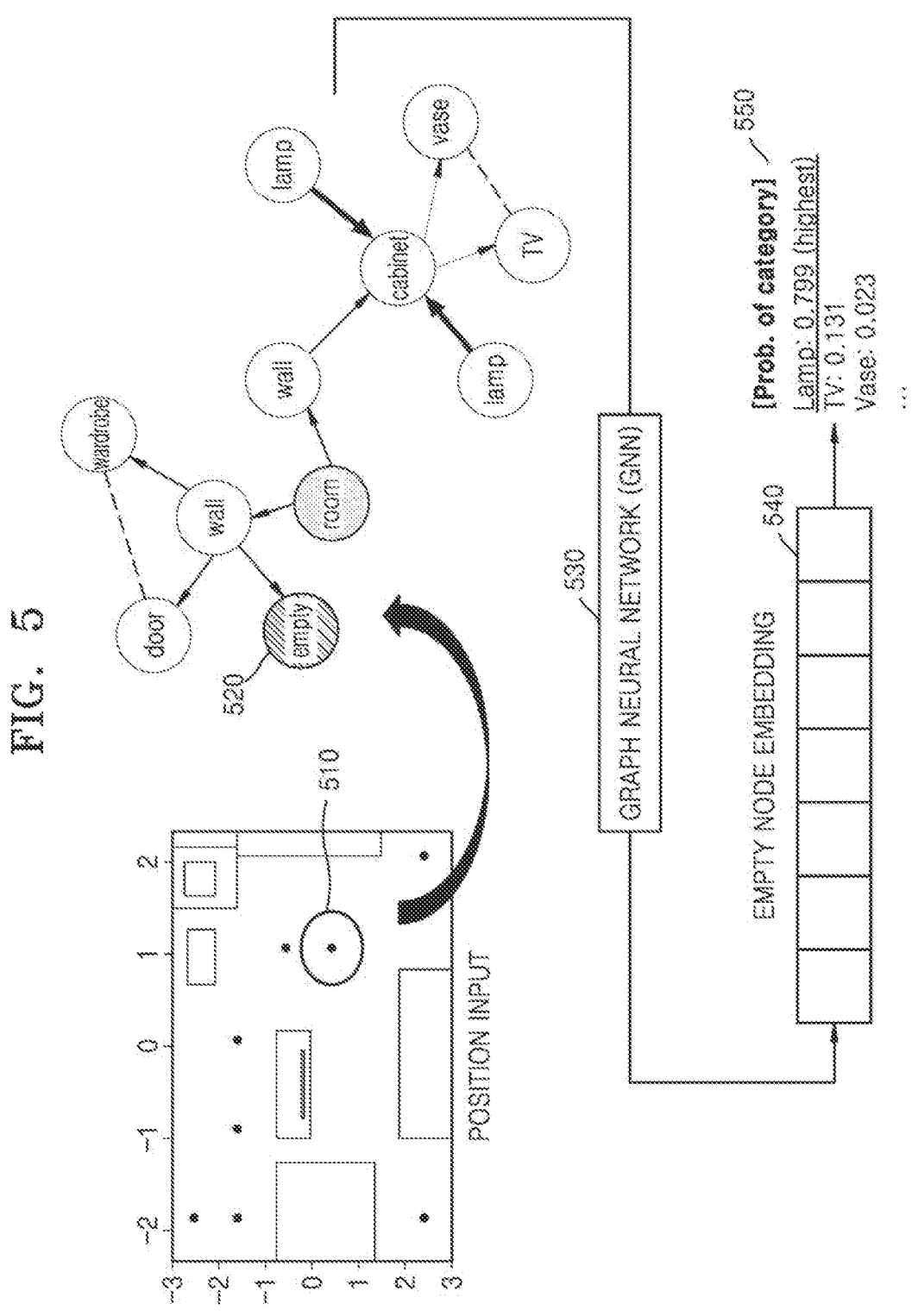
FIG. 5 is a diagram illustrating an operation, performed by an electronic device, of using a graph neural network, according to some embodiments.

FIG. 5 is a diagram illustrating an operation, performed by an electronic device, of using a GNN, according to some embodiments.

In describing FIG. 5, in order to distinguish between objects currently existing in a space and a new object to be placed, the objects currently existing in the space will be referred to as first objects and the new object will be referred to as a second object.

In some embodiments, the electronic device 2000 may receive a user input for changing object placement in the space. As described above, the user input may be a position input or an object input. When a position input is received, the electronic device 2000 may infer a second object to be placed at the input position. When an object input is received, the electronic device 2000 may infer a position in the space where the input object (e.g., a second object) is to be placed. FIG. 5 illustrates an example in which the user input is a position input.

In some embodiments, the electronic device 2000 may receive an input for selecting a first position 510 from among empty regions in the space in which no first objects are placed.

The electronic device 2000 may add an empty node 520 to a spatial graph based on the coordinates of the first position 510.

When adding the empty node 520 to the spatial graph, the electronic device 2000 may determine an edge of the empty node 520 to be adjacent to a node corresponding to a first object within a certain distance from the first position 510 among the first objects.

The electronic device 2000 may update the spatial graph by applying, to a GNN 530, the spatial graph to which the empty node 520 has been added. In this case, object feature vectors of the empty node 520 may be inferred, and the type of an edge to be connected to the empty node 520 may be predicted.

When empty node embedding 540 is completed, the electronic device 2000 may determine one or more object categories of second objects, which may be placed at the first position 510, based on the inferred object feature vectors, and output the determined object categories.

In some embodiments, the electronic device 2000 may receive an object input from the user and provide position prediction. An operation, performed by the electronic device 2000, of inferring an object based on a position input from the user or inferring a position where an object is to be placed, based on an object input from the user will be described in more detail below with reference to FIGS. 6A to 7B.

FIG. 6A is a diagram illustrating an operation, performed by an electronic device, of performing inference by using a GNN, according to some embodiments.

Figure 6B:
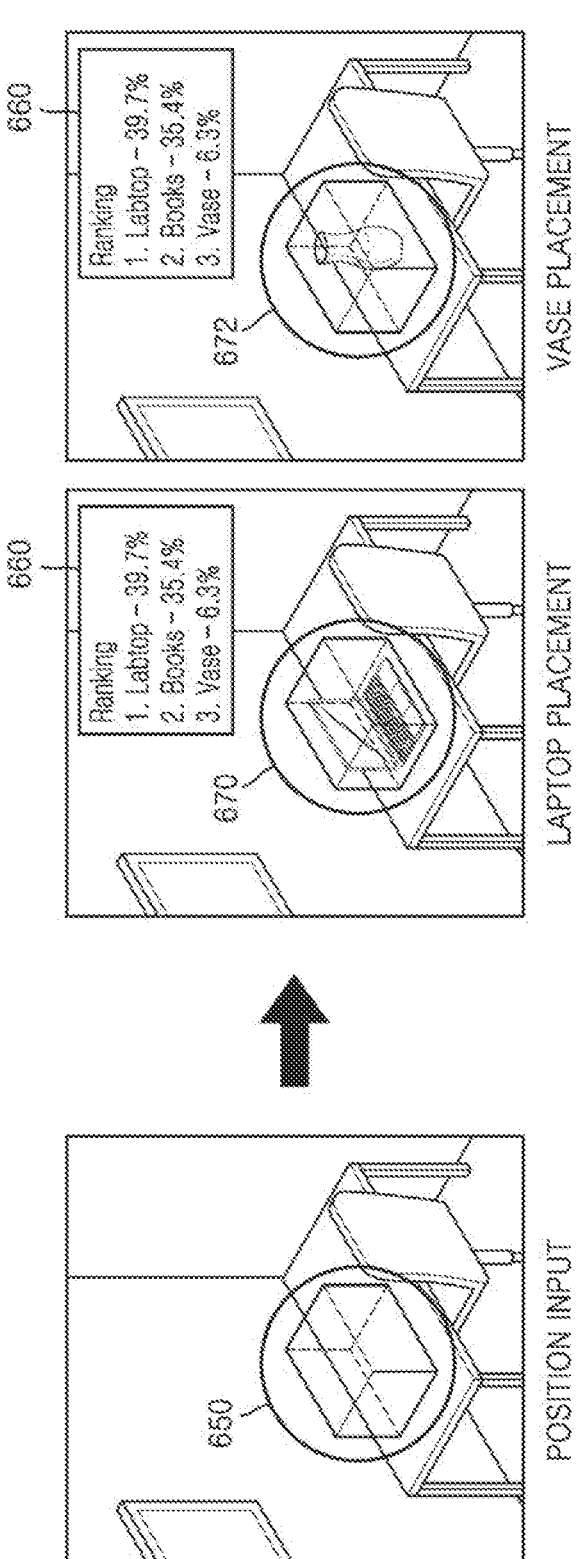
FIG. 6B is a diagram illustrating an operation, performed by an electronic device, of outputting object placement change-related information for a space, according to some embodiments.
Figure 6C:
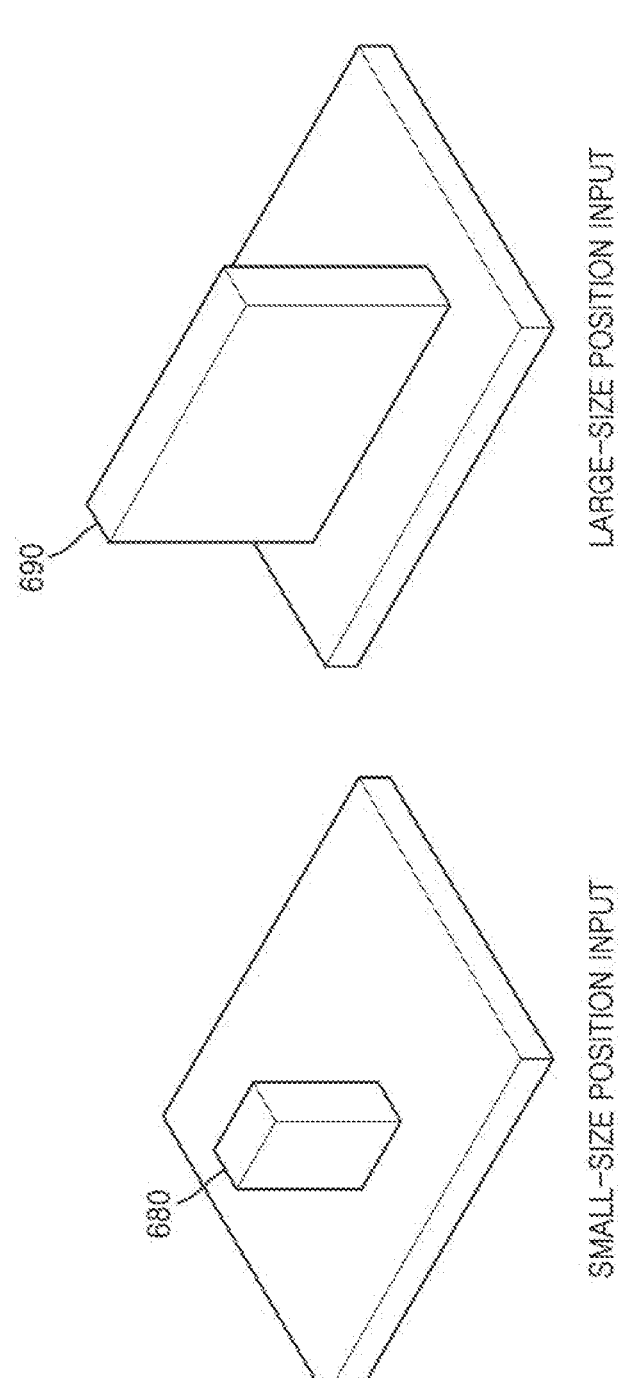
FIG. 6C is a diagram for further description of FIG. 6B, according to some embodiments.

In describing FIGS. 6A to 6C, in order to distinguish between objects currently existing in a space and a new object to be placed, the objects currently existing in the space will be referred to as first objects and the new object will be referred to as a second object.

In some embodiments, the electronic device 2000 may receive an input for selecting a first position from among empty regions in the space in which no first objects are placed.

The electronic device 2000 may add an empty node 610 to a spatial graph based on the coordinates of the first position. Here, the spatial graph may have been trained by a GNN 620 in the same manner as described above with reference to FIG. 4C. The empty node 610 may be a node representing a second object to be placed at the first position, and object feature vectors may not yet be embedded in the node.

When adding the empty node 610 to the spatial graph, the electronic device 2000 may connect an edge to the empty node 610 such that the empty node 610 is adjacent to a node corresponding to a first object within a certain distance from the first position, among the first objects. For example, an edge may be generated between the empty node 610 and a wall node 612.

The electronic device 2000 may update the spatial graph by applying, to the GNN 620, the spatial graph to which the empty node 610 has been added. In this case, object feature vectors of the empty node 610 may be inferred. In addition, the type of an edge to be connected to the empty node 610 may be predicted.

The inference of the object feature vector and the prediction of the type of the edge are determined by the GNN 620 applying attributes of the first objects to the empty node 610. In detail, the GNN 620 may aggregate messages received by the wall node 612 from other nodes adjacent to the wall node 612, and deliver the messages from the wall node 612 to the empty node 610. Accordingly, the empty node 610 may become a vector-embedded node 630 as feature vectors are embedded therein. This operation is described above and thus, redundant descriptions will be omitted for conciseness.

When the spatial graph is updated to include the vector-embedded node 630, the electronic device 2000 may determine one or more object categories of second objects, which may be placed at the first position, based on the object feature vectors of the vector-embedded node 630, and output at least one of the determined object categories, an object color, or an object size. For example, the electronic device 2000 may output probabilities 640 of object categories of second objects being placed at the first position. In this case, the GNN 620 has learned various object attributes, such as the styles, colors, types, positions, directions, or sizes of objects in a space, and relations between objects. Thus, the probabilities of the object categories of second objects may be a result of reflecting the characteristics of the space. Second objects inferred to be appropriate to be placed at the first position according to a result of outputting the probabilities 640 of the object categories of second objects may be, in order of probability, a lamp, a TV, and a vase.

FIG. 6B is a diagram illustrating an operation, performed by an electronic device, of outputting object placement change-related information for a space, according to some embodiments.

In some embodiments, the electronic device 2000 may generate a virtual space corresponding to the space and display the virtual space on the screen. The electronic device 2000 may receive an input for selecting a first position from among empty regions in which no first objects are placed.

For example, the electronic device 2000 may receive a user input for selecting an empty region 650 displayed on the screen. The electronic device 2000 may update a spatial graph by adding, to the spatial graph, an empty node corresponding to the empty region 650, and applying, to a GNN, the spatial graph to which the empty node has been added.

Based on the updated spatial graph, the electronic device 2000 may output object placement change-related information 660 for the space. For example, because the user input is a position input, the object placement change-related information 660 for the space may include a recommendation for an object to be placed at the input position. In detail, 'laptop', 'books', 'vase', and the like may be output as objects to be placed in the empty region 650. The object placement change-related information 660 may be displayed based on a priority order of object categories, but is not limited thereto.

The electronic device 2000 may display a virtual space in which an object is placed. The electronic device 2000 may receive a user input for testing object placement in the virtual space based on the object placement change-related information 660. For example, when the user selects 'laptop' based on the object placement change-related information 660, the electronic device 2000 may place a virtual object 670 representing a laptop in the virtual space. When the user selects 'vase' based on the object placement change-related information 660, the electronic device 2000 may place a virtual object 672 representing a vase in the virtual space.

FIG. 6C is a diagram for further description of FIG. 6B.

In some embodiments, a position input may include the size of a position. For example, a user may touch and drag an empty region in a virtual space displayed by the electronic device 2000 to designate a position in the empty region and a size of the position.

The electronic device 2000 may recommend an object to be placed at the input position based on the coordinates and size of the position in the position input from the user. When the position input is received from the user, the electronic device 2000 may add, to a spatial graph, an empty node corresponding to the input position. In this case, the position and size of the empty node may be included as an initial feature vector of the empty node. As a result of applying the spatial graph to which the empty node has been added, to the GNN by the electronic device 2000, the object feature vector embedded in the empty node may reflect the size of the position. In detail, feature vectors related to an object having a size within or outside a certain range based on the size of the input position may be embedded in the empty node, or features related to an object having a size less than or equal to the size of the input position may be embedded in the empty node.

For example, a user input for the same space may be a small-size position input 680 or a large-size position input 690. In this case, an object may be recommended based on the size of the position. For example, when the small-size position input 680 is received, the electronic device 2000 may output 'vase' as a recommended object. When the large-size position input 690 is received, the electronic device 2000 may output 'TV' as a recommended object.

Figure 7A:
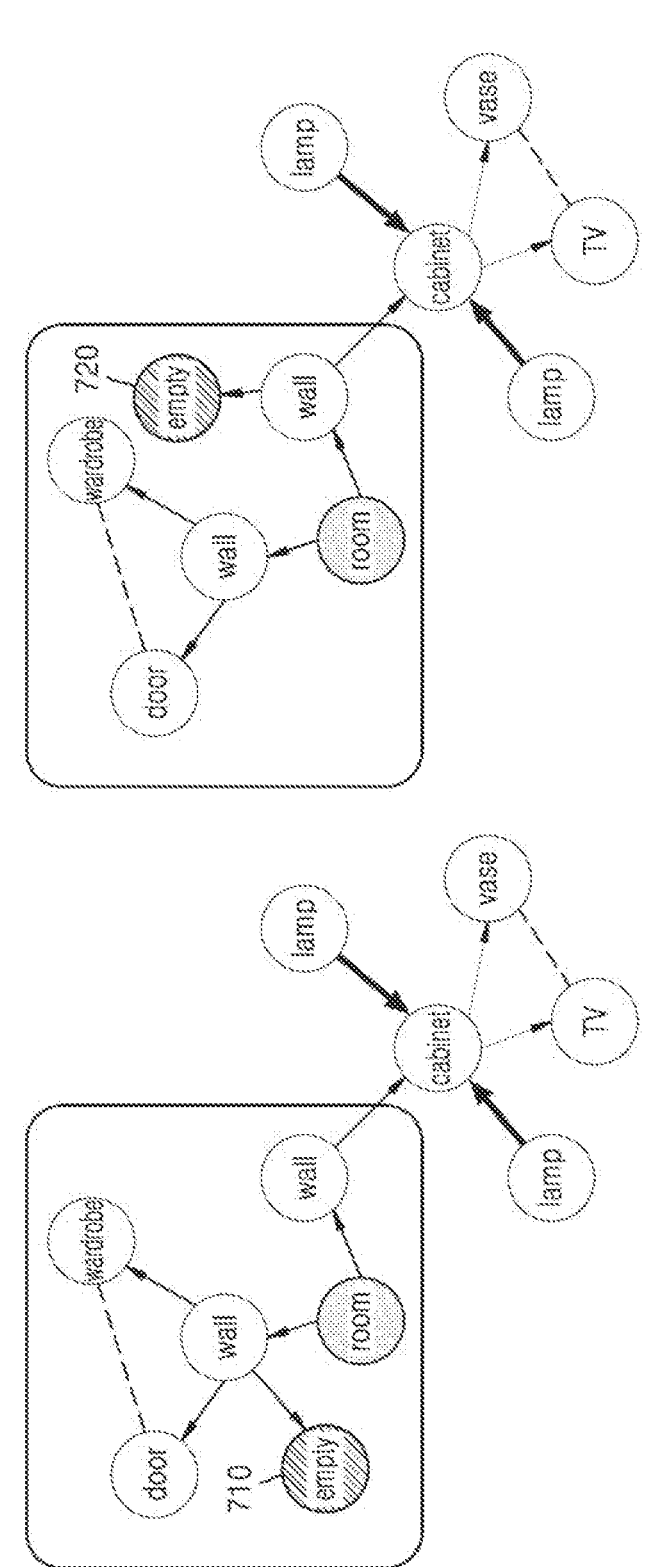
FIG. 7A is a diagram illustrating an operation, performed by an electronic device, of performing inference by using a graph neural network, according to some embodiments.

FIG. 7A is a diagram illustrating an operation, performed by an electronic device, of performing inference by using a GNN, according to some embodiments.

Figure 7B:
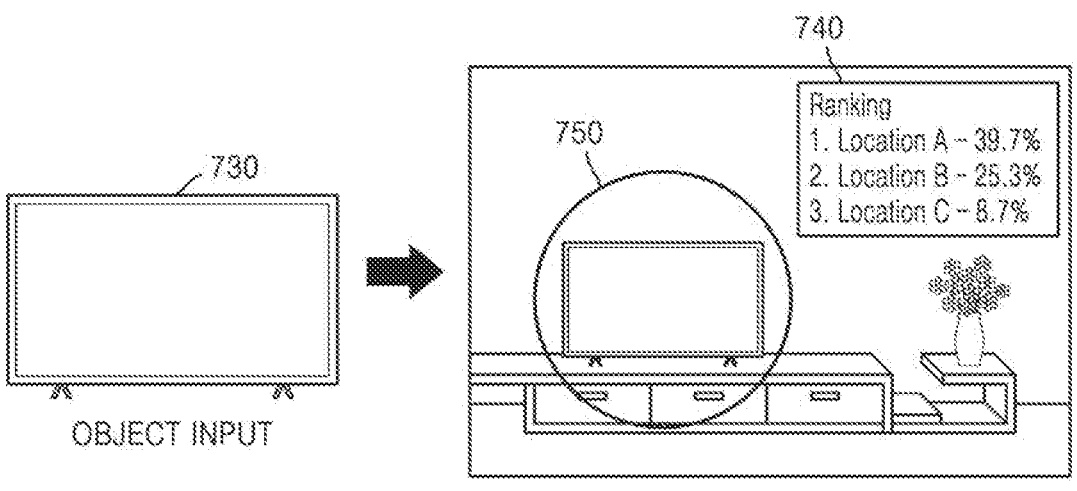
FIG. 7B is a diagram illustrating an operation, performed by an electronic device, of outputting object placement change-related information for a space, according to some embodiments.

In describing FIGS. 7A to 7B, in order to distinguish between objects currently existing in a space and a new object to be placed, the objects currently existing in the space will be referred to as first objects and the new object will be referred to as a second object.

In some embodiments, the electronic device 2000 may receive a request for a recommendation for a position of a second object that is not currently placed in the space. For example, when the user inputs information related to a second object (e.g., category or model name), the electronic device 2000 may recommend a position in the space where the second object is to be placed.

The electronic device 2000 may add one or more empty node candidates to a spatial graph based on an object input indicating a second object (e.g., the object category of the second object or the model name of the second object). For example, a spatial graph to which a first empty node candidate 710 has been added and a spatial graph to which a second empty node candidate 720 has been added may be generated, and a spatial graph to which both the first empty node candidate 710 and the second empty node candidate 720 are added may also be generated. The empty node candidate may be generated to correspond to an empty region in the space and may include position information of the empty region. For example, the first empty node candidate 710 may include position information of a first position, which is an empty region in the space, and the second empty node candidate 720 may include position information of a second position, which is another empty region in the space. A node representing a position most suitable for placing the second object may be finally selected from among the empty node candidates.

The electronic device 2000 may update the spatial graph by applying, to a GNN, the spatial graph to which the empty node candidate has been added. In this case, object feature vectors of the empty node may be inferred. In addition, the type of an edge to be connected to the empty node may be predicted. The inference of the object feature vector and the prediction of the type of the edge are determined by the GNN applying attributes of first objects to the empty node. For example, the electronic device 2000 may perform embedding on the first empty node candidate 710 by applying, to the GNN, the spatial graph to which the first empty node candidate 710 has been added. The electronic device 2000 may perform embedding on the second empty node candidate 720 by applying, to the GNN, the spatial graph to which the second empty node candidate 720 has been added. The electronic device 2000 may perform embedding on both the first empty node candidate 710 and the second empty node candidate 720 by applying, to the GNN, the spatial graph to which both the first empty node candidate 710 and the second empty node candidate 720 are added.

The electronic device 2000 may select one or more of the empty node candidates based on results of performing the embedding on the empty node candidates. For example, the electronic device 2000 may compare the object feature vectors embedded in the first empty node candidate 710 with an object category of second objects.

In detail, an example will be described in which the object category of second objects is 'TV' as the user inputs an object input 'TV' to place a TV. Object categories inferred from the first empty node candidate 710 may be 'TV', 'vase', and 'laptop' in order, which are results obtained by the electronic device 2000 updating the spatial graph by using the GNN and determining the object categories based on the object feature vectors embedded in the first empty node candidate 710. This order means that the order of suitability of the categories of objects to be placed at the position corresponding to the first empty node candidate 710 is 'TV', 'vase', and 'laptop'. In the same manner, the categories of objects inferred from the second empty node candidate 720 may be 'laptop', 'vase', and 'TV' in order. This order means that the order of suitability of the catego-ries of objects to be placed at the position corresponding to the second empty node candidate 720 is 'laptop', 'vase', and 'TV'. In this case, the electronic device 2000 may select, as final data of the spatial graph, the first empty node candidate 710 from among the first empty node candidate 710 and the second empty node candidate 710. Accordingly, the finally updated spatial graph may include the selected node (i.e., a node obtained by embedding object feature vectors in the first empty node candidate 710).

When the spatial graph is updated to include the selected node, the electronic device 2000 may determine one or more positions in the space where the second object is to be placed, based on the object feature vectors of the selected node, and output the determined positions. For example, the electronic device 2000 may output coordinates of a position where the second object is to be placed. When the electronic device 2000 is able to display a virtual space corresponding to the space on the screen, the electronic device 200 may display, on the screen, the position where the second object is to be placed.

FIG. 7B is a diagram illustrating an operation, performed by an electronic device, of outputting object placement change-related information for a space, according to some embodiments.

In some embodiments, the electronic device 2000 may generate a virtual space corresponding to the space and display the virtual space on the screen. The electronic device 2000 may receive a request for a recommendation for a position of a second object that is not currently placed in the space.

For example, the electronic device 2000 may receive a user input for selecting, as the second object, a TV 730 that is an object category. In order to find a position in the space where the TV 730 is to be placed, the electronic device 2000 may add one or more empty node candidates to a spatial graph and update the spatial graph by applying, to a GNN, the spatial graph to which the one or more empty node candidates are added.

Based on the updated spatial graph, the electronic device 2000 may output object placement change-related informa-tion 740 for the space. For example, because the user input is an object input, the object placement change-related information 740 for the space may include a recommenda-tion for a position where the input object is to be placed. In detail, position A, position B, position C, and the like may be recommended as positions where the TV 730 is to be placed. The object placement change-related information 740 for recommending the positions where the object is to be placed may be displayed based on an order of priority of the positions, but is not limited thereto.

The electronic device 2000 may display a position where an object is to be placed, in the virtual space. The electronic device 2000 may receive a user input for testing object placement in the virtual space based on the object placement change-related information 740. For example, when the user selects position A based on the object placement change-related information 740, the electronic device 2000 may place a virtual object representing the TV 730 at a position 750 in the virtual space corresponding to position A. When the user selects position B, the electronic device 2000 may place a virtual object representing the TV 730 at a position in the virtual space corresponding to position B.

Figure 8:
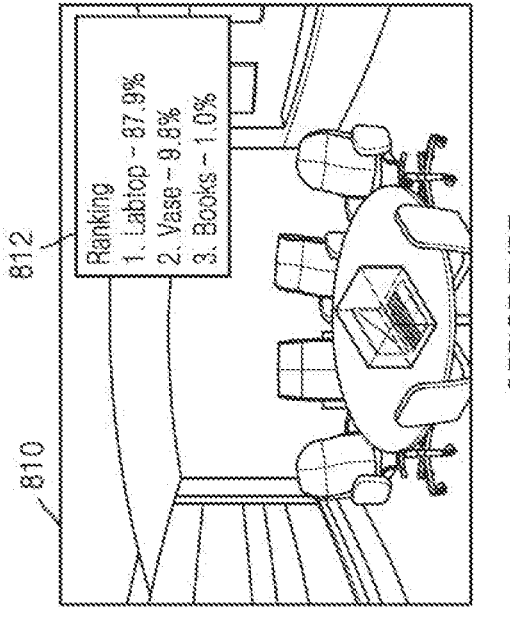
FIG. 8 is a diagram illustrating an operation, performed by an electronic device, of outputting object placement change-related information for a space based on the type of the space, according to some embodiments.

FIG. 8 is a diagram illustrating an operation, performed by an electronic device, of outputting object placement change-related information for a space based on the type of the space, according to some embodiments.

In some embodiments, a spatial graph may include a node corresponding to the type of the space. The type of the space may be, for example, room, living room, office, or the like, but is not limited thereto. The node corresponding to the type of the space may include feature vectors related to the type of the space. The feature vectors related to the type of the space may include, for example, the type of the space, a main object in the space, the style of the space, the color of the space, and the like, but are not limited thereto.

As spaces may be classified into a plurality of types, a plurality of spatial graphs may exist. For example, different spatial graphs may be obtained for spaces having different purposes of use, such as a (general) room, a bedroom, a study, a living room, a dressing room, and the like in a house. In this case, each of a plurality of spatial graphs may be generated based on three-dimensional spatial data of each space and data related to objects in each space.

In some embodiments, as the spatial graph includes a node corresponding to the type of the space, the electronic device 2000 may use a GNN to train the spatial graph to reflect features of the space. That is, the spatial graph may correspond to a space type. For example, there may be a spatial graph corresponding to an office type 810 and a spatial graph corresponding to a room type 820. In this case, as described above with reference to FIG. 4C, by applying, to the GNN, the spatial graph corresponding to the office type 810, embedding may performed on nodes in the spatial graph, and objects existing in a space of the office type 810 and positional relations between the objects may be reflected in feature vectors and edges in the spatial graph. In addition, by applying, to the GNN, the spatial graph corresponding to the room type 820, embedding may be performed on nodes in the spatial graph, and objects existing in a space of the room type 820 and positional relations between the objects may be reflected in feature vectors and edges in the spatial graph.

In some embodiments, the electronic device 2000 may identify the type of a space based on a user input, and load a spatial graph corresponding to the identified type of the space.

For example, when the user designates the office type 810 as a space type, a spatial graph corresponding to the office type 810 may be loaded. In this case, the electronic device 2000 may generate a virtual space corresponding to an office space and display the virtual space on the screen. According to the above-described embodiments, when an object input or a position input for the virtual space is received from the user, the electronic device 2000 may apply the spatial graph corresponding to the office type 810 to the GNN. The electronic device 2000 may update the spatial graph corre-sponding to the office type 810 and output object placement change-related information 812 for the office space, based on the updated spatial graph. For example, as an output in response to a position input from the user, 'laptop', 'vase', 'books', and the like as objects to be placed on a table in the virtual space corresponding to the office type 810 may be output. Although not illustrated in FIG. 8, as an output in response to an object input from the user, positions in the virtual space corresponding to the office type 810 where an object input by the user is to be placed may be output. In this case, the spatial graph corresponding to the office type 810 may also be used. Here, the object placement change-related information 812 for the office space indicates that objects suitable for the office space (or positions where an object is to be placed) are recommended by using the spatial graph corresponding to the office type 810.

As an additional example, when the user designates the room type 820 as the space type, the spatial graph corresponding to the room type 820 may be loaded. Accordingly, the electronic device 2000 may apply, to the GNN, the spatial graph corresponding to the room type 820. The electronic device 2000 may output object placement change-related information 822 for a room space. For example, as an output in response to a position input from the user, the object placement change-related information 822 for the room space indicating 'TV', 'laptop', 'plant', and the like as objects to be placed on a TV stand in the room space may be output. Here, the object placement change-related information 822 for the room space indicates that objects suitable for the room space (or positions where an object is to be placed) are recommended by using the spatial graph corresponding to the room type 820.

Figure 9A:
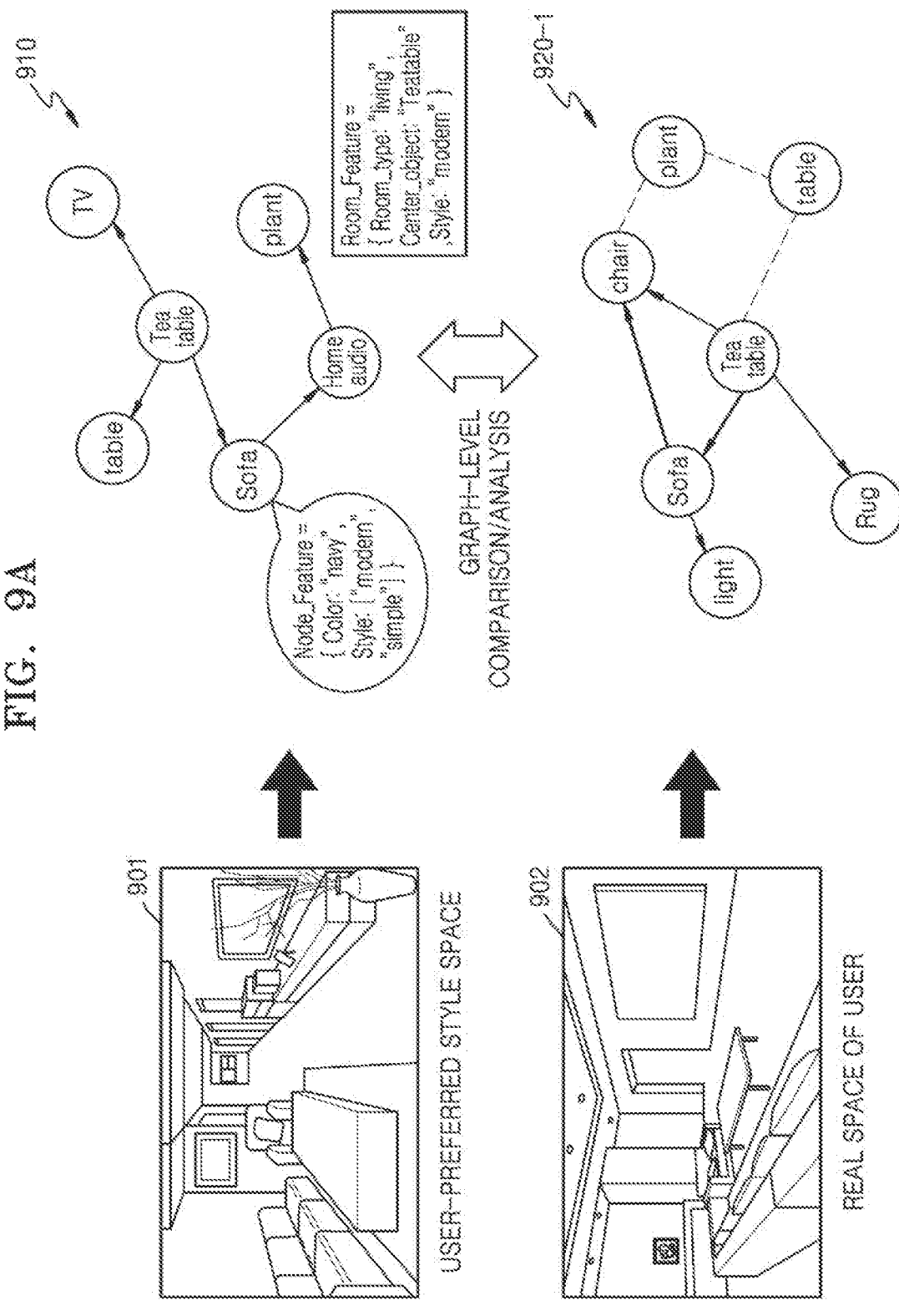
FIG. 9A is a diagram illustrating an operation, performed by an electronic device, of generating a personalized spatial graph, according to some embodiments.

FIG. 9A is a diagram illustrating an operation, performed by an electronic device, of generating a personalized spatial graph, according to some embodiments.

In describing FIG. 9A, a user-preferred style space 901 refers to a space in which interior design elements are configured in a style preferred by the user. For example, the interior design elements of the space may include various elements that may serve as criteria for the user's preference, such as the style of the space (e.g., modern or vintage) and the color of the space (e.g., white, wood, or gray), and the preference may be selected or input by the user.

In some embodiments, the electronic device 2000 may obtain a user-preferred style space image including a user-preferred style (hereinafter, referred to as a preferred space image). For example, the electronic device 2000 may receive a preferred space image from the user.

The electronic device 2000 may extract various features for generating a spatial graph, from the preferred space image. For example, the electronic device 2000 may identify the type, style, and the like of the user-preferred style space 901 from the preferred space image. In this case, a scene classification model, which is an artificial intelligence model for detecting/recognizing scene features from an image, may be used. For example, the electronic device 2000 may detect/recognize, from the preferred space image, one or more objects existing in the user-preferred style space 901. In this case, an object detection/recognition model, which is an artificial intelligence model for detecting/recognizing an object in a space, may be used. The electronic device 2000 may generate a preferred spatial graph 910 by converting features of the user-preferred style space 901 into data based on the features extracted from the preferred space image. The preferred spatial graph 910 may include nodes representing objects existing in the user-preferred style space 901, and edges representing positional relations between the objects. In some embodiments, the electronic device 2000 may train the preferred spatial graph 910 by applying the preferred spatial graph 910 to the GNN, such that the feature vectors of the preferred spatial graph 910 are supplemented and/or modified.

In some embodiments, the electronic device 2000 may obtain a spatial graph 920-1 corresponding to a real space

902 of the user. The spatial graph 920-1 corresponding to the real space 902 of the user may be generated based on three-dimensional spatial data and object-related data, which is described above, and thus, redundant descriptions will be omitted for conciseness.

In some embodiments, the electronic device 2000 may personalize the spatial graph 920-1 by modifying at least one of the nodes or the edges of the spatial graph 920-1 that corresponds to the real space 902 of the user based on a result of comparing the preferred spatial graph 910 with the spatial graph 920-1 corresponding to the real space 902 of the user. Personalization of the spatial graph 920-1 will be further described below with reference to FIG. 9B.

The electronic device 2000 may obtain the preferred spatial graph 910 in various manners, in addition to obtaining the preferred spatial graph 910 from the preferred space image as described above.

For example, the electronic device 2000 may provide a spatial data store through which the user may select and/or purchase a preferred style. The store may be provided in the form of an application through the electronic device 2000, but is not limited thereto. The spatial data store may include two-dimensional and/or three-dimensional images of spaces and spatial graphs corresponding thereto. The spatial data store may be a platform provided by using a separate server, where various users may share and/or sell spatial data in which spaces are decorated in their own styles. Accordingly, the spatial graph 920-1 corresponding to the real space 902 of the user may also be uploaded to the spatial data store to be shared.

The user may use the electronic device 2000 to view two-dimensional and/or three-dimensional images of a space in a style preferred by the user from the spatial data store and download the preferred spatial graph 910. The electronic device 2000 may compare the downloaded preferred spatial graph 910 with the spatial graph 920-1 corresponding to the real space 902 of the user, and personalize the spatial graph 920-1 corresponding to the real space 902 of the user.

In some embodiments, the electronic device 2000 may obtain the preferred spatial graph 910 by using short-range/long-range wireless communication (e.g., Bluetooth or Wi-Fi Direct) between the electronic device 2000 and another electronic device.

Figure 9B:
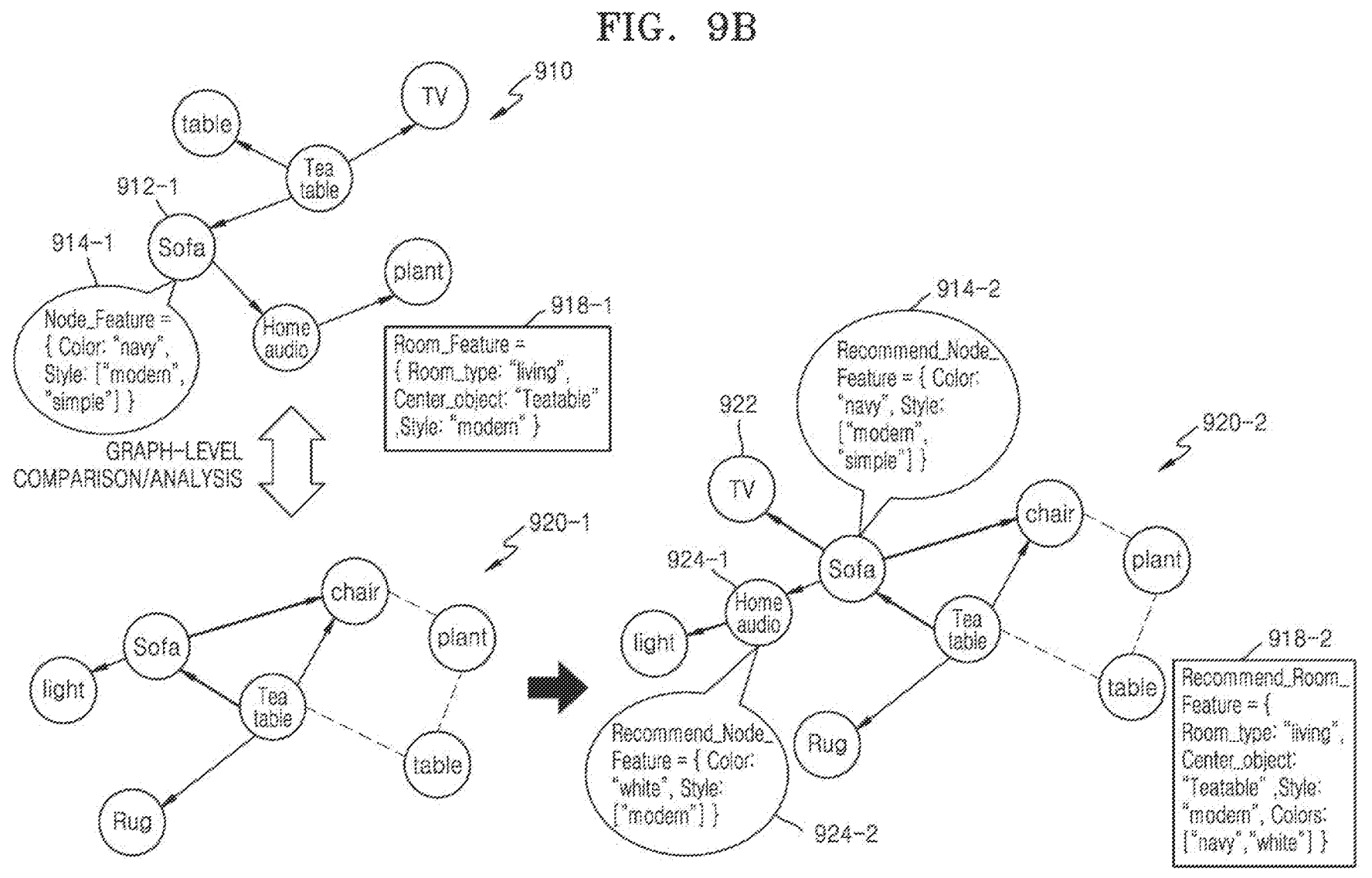

FIG. 9B is a diagram illustrating an operation, performed by an electronic device, of outputting personalized recommendation information about a change in object placement in a space, based on a personalized spatial graph, according to some embodiments.

In some embodiments, the electronic device 2000 may compare the preferred spatial graph 910 with the spatial graph 920-1 corresponding to the real space 902 of the user (hereinafter, referred to as the 'spatial graph 920-1' for convenience of description). The electronic device 2000 may obtain a personalized spatial graph 920-2 by performing graph-level comparison/analysis on the similarity, difference, and the like between nodes and edges of the preferred spatial graph 910 and the spatial graph 920-1 corresponding to the real space 902 of the user, and updating the spatial graph 920-1. The personalized spatial graph 920-2 may be a spatial graph obtained by reflecting the features of the preferred spatial graph 910 in the spatial graph 920-1.

In some embodiments, the electronic device 2000 may output personalized recommendation information related to a change in object placement in the real space 902 of the user, based on the personalized spatial graph 920-2.

The personalized recommendation information may include at least one of a recommendation that the positions of at least some of objects existing in the real space 902 of the user be changed, a recommendation that any one of the objects existing in the real space 902 of the user be substituted with another object, a recommendation that the other object be newly placed, or a recommendation for the style of the real space 902 of the user, but is not limited thereto.

For example, the personalized spatial graph 920-2 may include nodes corresponding to newly added objects (e.g., a TV node 922 and a home audio node 924-1). The electronic device 2000 may recommend changing the positions of at least some of the objects existing in the real space 902 of the user, based on the personalized spatial graph 920-2. In detail, based on the inclusion of the TV node 922 in the personalized spatial graph 920-2, the electronic device 2000 may recommend changing the position of a sofa to a position suitable for watching a TV, considering the possibility of the TV being placed in the real space 902 of the user. As another example, the electronic device 2000 may recommend switching the positions of the objects existing in the real space 902 of the user. However, the disclosure is not limited to the above examples, and the electronic device 2000 may provide the user with various recommendable ways of changing the position of an object, based on the personalized spatial graph 920-2.

For example, among the nodes included in the preferred spatial graph 910, a sofa node 912-1 may include feature vectors 914-1, which are 'color: navy' and 'style: modern, simple'. In this case, as the spatial graph 920-1 is updated to the personalized spatial graph 920-2, the personalized spatial graph 920-2 may include feature vectors 914-2 of the updated sofa node. The electronic device 2000 may recommend changing the color of a sofa existing in the real space 902 of the user to a navy color, based on the feature vectors 914-2 of the sofa node of the personalized spatial graph 920-2.

For example, a TV node and a home audio node are included in the preferred spatial graph 910, but the TV node and the home audio node may not be included in the spatial graph 920-1. In this case, as the spatial graph 920-1 is updated to the personalized spatial graph 920-2, the newly added TV node 922 and home audio node 924-1 may be included in the personalized spatial graph 920-2. The electronic device 2000 may recommend placing a TV and a home audio system, which are new objects, in the real space 902 of the user, based on the feature vectors of the newly added nodes of the personalized spatial graph 920-2. In this case, the electronic device 2000 may further recommend a position where the new object is to be placed, a positional relation between the new object and other existing objects, the style of the new object, and the like. In detail, based on feature vectors 924-2 of the newly added home audio node 924-1, the electronic device 2000 may recommend placing a white-colored, modern-style product as the newly added home audio system.

For example, although not illustrated in the preferred spatial graph 910 of FIG. 9B, the preferred spatial graph 910 may include a node corresponding to a space type. In detail, the preferred spatial graph 910 may include a node corresponding to a space type 'living room', and spatial feature vectors 918-1 may be included in the living room node. In this case, as the spatial graph 920-1 is updated to the personalized spatial graph 920-2, the node (not shown) of the personalized spatial graph corresponding to 'living room' may include updated spatial feature vectors 918-2. The electronic device 2000 may recommend an overall space style of the real space 902 of the user based on the spatial feature vectors of the personalized spatial graph 920-2. In detail, the electronic device 2000 may recommend an interior design with a modern style and navy and white colors, for the real space 902 of the user. That is, the electronic device 2000 may provide the user with a recommendation for making the real space 902 of the user similar to the user-preferred style space 901 in object placement, space color, interior design, and the like.

The personalized spatial graph 920-2 may be continuously updated. For example, when a second preferred space image is obtained after the spatial graph 920-1 is updated to the personalized spatial graph 920-2 as the first preferred space image is obtained, the personalized spatial graph 920-2 may be additionally updated based on the second preferred image.

FIG. 10A is a diagram illustrating an operation, performed by an electronic device, of generating a metaverse spatial graph, according to some embodiments.

Figure 10B:
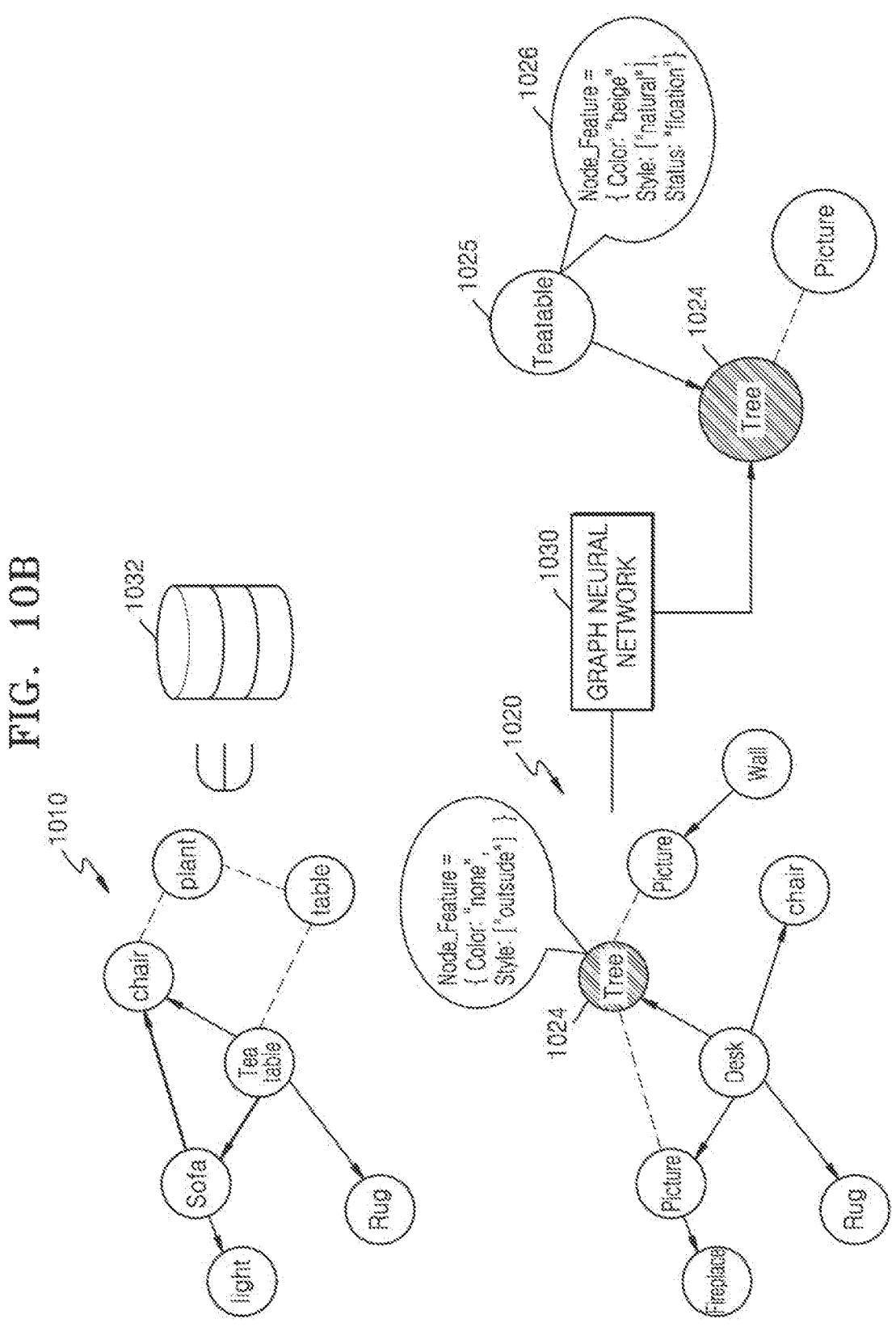
FIG. 10B is a diagram illustrating an operation, performed by an electronic device, of updating a metaverse spatial graph, according to some embodiments.

In describing FIGS. 10A and 10B, in order to distinguish between metaverse objects currently existing in a metaverse space and a metaverse object to be newly placed, the metaverse objects currently existing in the metaverse space will be referred to as first metaverse objects and the new object will be referred to as a second metaverse object.

In some embodiments, the user of the electronic device 2000 may perform an activity in a virtual world such as a metaverse space 1002. For example, the user may create his/her own metaverse space 1002, decorate the metaverse space 1002, and interact with the metaverse space 1002. In this case, the electronic device 2000 may apply the above-described embodiment to the metaverse space 1002 to provide the user with object placement change-related information for the metaverse space 1002.

In the disclosure, the metaverse space 1002 refers to a space in which a separate virtual world different from real spaces is implemented as a virtual environment. That is, a physical space layout of the metaverse space 1002 may have unique characteristics different from those of real spaces. For example, it may be impossible to place certain objects (e.g., a vase) on wall surfaces, ceilings, and the like in real spaces, whereas it may be possible to place those certain objects on wall surfaces, ceilings, and the like in the metaverse space 1002.

In some embodiments, the metaverse space 1002 may be generated by the electronic device 2000. For example, the electronic device 2000 may generate the metaverse space 1002 based on metaverse space-related data (e.g., metaverse spatial data and metaverse objects) stored in the electronic device 2000 or received from the outside. The electronic device 2000 may display a layout of the metaverse space 1002 on the screen, and generate the metaverse space 1002 based on a user input (e.g., for changing the metaverse space layout or object placement) for the displayed metaverse space 1002.

In some embodiments, the electronic device 2000 may obtain a metaverse spatial graph 1020 corresponding to the metaverse space 1002. For example, data corresponding to the metaverse space 1002 may include metaverse spatial data and object-related data for metaverse objects. The electronic device 2000 may obtain metaverse spatial data representing the metaverse space 1002 and object-related data for first metaverse objects in the metaverse space.

The metaverse spatial graph 1020 may reflect features of the metaverse space in which a physical space layout is different from those of real spaces. For example, in the metaverse spatial graph 1020, a desk node 1022 corresponding to an object 'desk' existing indoors and a tree node 1024 corresponding to an object 'tree' existing outdoors may be neighboring nodes connected to each other through an edge.

In some embodiments, the electronic device 2000 may update the metaverse spatial graph 1020 by applying the metaverse spatial graph to a GNN. When updating the metaverse spatial graph 1020, the electronic device 2000 may reflect features of a real space 1001 of the user. To this end, the electronic device 2000 may train a spatial graph 1010 corresponding to the real space 1001 of the user by using the GNN to which the metaverse spatial graph 1020 is input. The spatial graph 1010 corresponding to the real space 1001 of the user may be generated based on three-dimensional spatial data and object-related data, which is described above, and thus, redundant descriptions will be omitted.

The electronic device 2000 may apply the spatial graph 1010 corresponding to the real space 1001 of the user to the GNN as training data such that the GNN learns the features of the real space 1001 of the user.

The operation, performed by the electronic device 2000, of obtaining and using an updated metaverse spatial graph by applying the metaverse spatial graph 1020 to the GNN will be further described below with reference to FIG. 10B.

FIG. 10B is a diagram illustrating an operation, performed by an electronic device, of updating a metaverse spatial graph, according to some embodiments.

In some embodiments, the electronic device 2000 may update the metaverse spatial graph 1020 by using a GNN 1030. The GNN 1030 may have been trained based on a training dataset 1032 including a plurality of spatial graphs. In this case, the spatial graph 1010 corresponding to the real space 1001 of the user may be included in the training dataset 1032 such that a result reflecting the features of the real space 1001 of the user is output from the GNN 1030. The electronic device 2000 may train the GNN 1030 by using the training dataset 1032 including the spatial graph 1010 corresponding to the real space 1001 of the user.

In some embodiments, the electronic device 2000 may receive a user input for placing a second metaverse object in the metaverse space. The electronic device 2000 may add an empty node to the metaverse spatial graph 1020 and perform node embedding, based on the user input. For example, the tree node 1024 may be included in the metaverse spatial graph, and an empty node may be added to be adjacent to the tree node 1024 based on the user input. Thereafter, as a result of node embedding performed by the electronic device 2000 using the GNN 1030, the empty node may become a tea table node 1025. The tea table node 1025 may be a node in which object feature vectors 1026 are embedded.

In detail, the user input may be a position input for inputting a position next to a tree in the metaverse space 1002. In this case, the tea table node 1025 may be generated to be adjacent to the tree node 1024 as an empty node is added and node embedding is performed according to the above-described embodiment. The user input may be an object input for inputting a tea table object in the metaverse space 1002. In this case, the tea table node 1025 may be generated to be adjacent to the tree node 1024 as an empty node is added and node embedding is performed according to the above-described embodiment.

The updated metaverse spatial graph 1020 is a spatial graph reflecting user preferences while being free from spatial and physical constraints. The electronic device 2000 may output information for placing the second metaverse object in the metaverse space 1002 based on the updated metaverse spatial graph 1020. For example, the electronic device 2000 may recommend placing a tea table next to a tree in the metaverse space 1002, based on the feature vectors 1026 of the tea table node 1025 of the updated metaverse spatial graph 1020. In this case, based on the feature vectors 1026 of the tea table node 1025, the electronic device 2000 may recommend placing a tea table with a natural style and a beige color to levitate, but the disclosure is not limited thereto.

When the user wants to organize a space within a metaverse feature-based virtual environment, the electronic device 2000 according to an embodiment may provide the user with a metaverse space design reflecting all of the user's preferred features and the unique features of metaverse spaces (e.g., removal of an outer wall of a building) by using the metaverse spatial graph 1020 and the spatial graph 1010 of the user.

Figure 11:
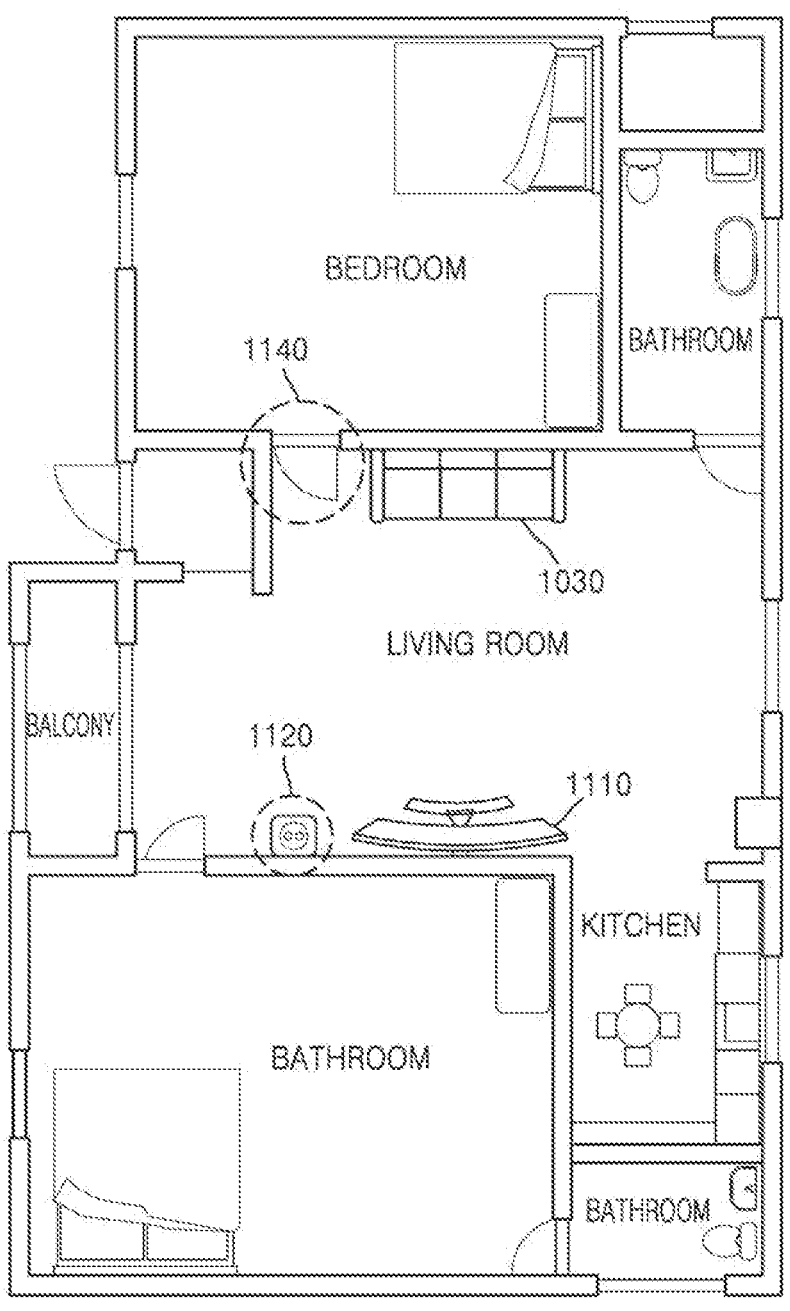
FIG. 11 is a diagram illustrating an operation, performed by an electronic device, of recommending information related to object placement based on features of a real space, according to some embodiments.

FIG. 11 is a diagram illustrating an operation, performed by an electronic device, of recommending information related to object placement based on features of a real space, according to some embodiments.

In some embodiments, three-dimensional spatial data may further include data related to spatial design specifications. The data related to the spatial design specifications may include, for example, the position of a wall socket, the position of a light, the position of a door, the position of a communication port, the position of a water supply unit, and the like, but is not limited thereto. Since the three-dimensional spatial data includes the data related to the spatial design specifications, a spatial graph generated based on the three-dimensional spatial data may also include the data related to the spatial design specifications. The electronic device 2000 may train a GNN by using the spatial graph including the data related to the spatial design specifications, and use the trained spatial graph.

In some embodiments, the electronic device 2000 may output object placement change-related information for a space, based on the attributes of an object and design specifications of the space. For example, when generating the object placement change-related information for the space according to the above-described embodiments, the electronic device 2000 may generate the object placement change-related information for the space further based on the data related to the design specifications of the space. That is, when the electronic device 2000 receives a user input (e.g., an object input and/or a position input) and applies the spatial graph to the GNN, object placement change-related information reflecting the design specifications of the space and the attributes of the object may be generated.

For example, a TV 1110 is a home appliance that requires a supply of power. In this case, a position 1120 of a wall socket included in the data related to the design specifications of the space may be used. Data representing the attributes of the TV 1110 may include information that the TV 1110 is a home appliance that requires a supply of power.

For example, when the electronic device 2000 provides information for placing the TV 1110 in the space, the position 1120 of the wall socket may be reflected. In detail, the electronic device 2000 may recommend that the TV 1110 be placed at a position within a certain distance from the position 1120 of the wall socket.

For example, when the electronic device 2000 provides information for placing the TV 1000 in the space, information about the position 1120 of the wall socket may be provided together. In detail, when the electronic device 2000 recommends that the TV 1110 be placed at a position farther than the certain distance from the position 1120 of the wall socket, the electronic device 2000 may further recommend that power be supplied to the TV 1110 by using a power strip.

As an additional example, a sofa 1130 is furniture that does not require a supply of power. In this case, a position 1140 of a door included in the data related to the design specifications of the space may be used. Data representing the attributes of the sofa 1130 may include information that the sofa 1130 is furniture that needs to be positioned not to overlap the position 1140 of the door when placing the sofa 1130 in direct contact with a wall.

For example, when the electronic device 2000 provides information for placing the sofa 1130 in the space, the position 1140 of the door may be reflected. In detail, the electronic device 2000 may recommend that the sofa 1130 be placed at a position that does not interfere with opening/closing of the door.

For example, when the electronic device 2000 provides information for placing the sofa 1130 in the space, information about an object associated with the sofa 1130 may be reflected. In detail, the object associated with the sofa 1130 may be the TV 1110. When recommending a position where the sofa 1130 is to be placed, the electronic device 2000 may recommend that the sofa 1130 be placed to face the TV 1110. Based on the screen size of the TV 1110, the electronic device 2000 may recommend a separation distance between the sofa 1130 and the TV 1110 (e.g., 2 meters for a 50-inch TV or 3 meters for a 75-inch TV). Based on the resolution of the TV 1110, the electronic device 2000 may recommend a separation distance between the sofa 1130 and the TV 1110 (e.g., 3 meters for a 50-inch FHD TV or 2 meters for a 75-inch UHD TV).

The above-described examples are not independently implemented, and all possible combinations of the above-described examples may be performed.

The electronic device 2000 according to some embodiments may perform computations such that various types of objects are placed at optimal positions in a space based on design specifications of the space and the attributes of the objects, provide the user with a recommendation based on a result of the computations, and thus accurately and conveniently assist the user in interior design of a real space.

Figure 12:
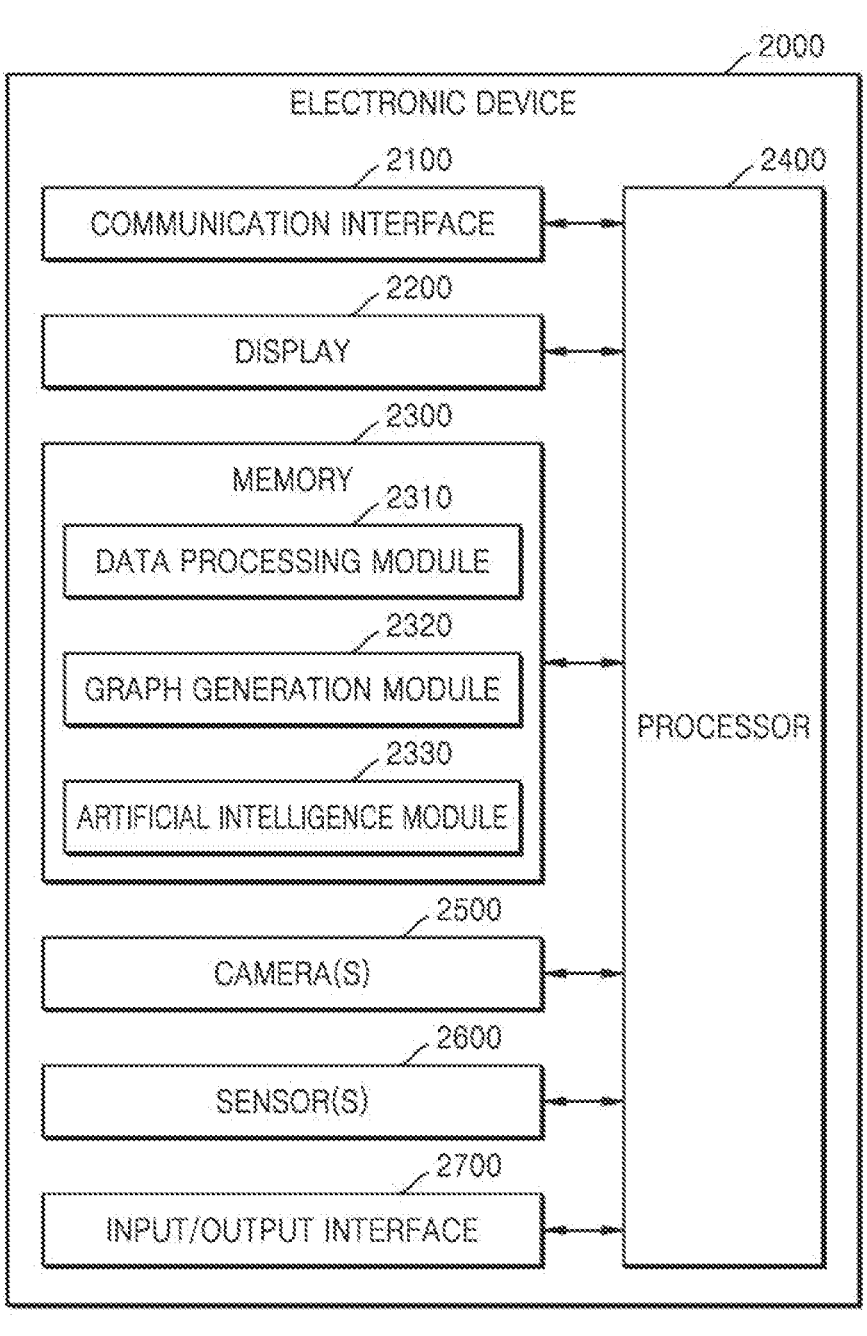
FIG. 12 is a block diagram illustrating a configuration of an electronic device according to some embodiments.

FIG. 12 is a block diagram illustrating a configuration of an electronic device according to some embodiments.

The electronic device 2000 according to some embodiments may include a communication interface 2100, a display 2200, a memory 2300, and a processor 2400.

The communication interface 2100 may perform data communication with other electronic devices under control by the processor 2400.

The communication interface 2100 may include a communication circuit. The communication interface 2100 may include a communication circuit capable of performing data communication between the electronic device 2000 and other devices by using at least one of data communication schemes, for example, wired local area network (LAN), wireless LAN, Wi-Fi, Bluetooth, ZigBee, Wi-Fi Direct (WFD), Infrared Data Association (IrDA), Bluetooth Low Energy (BLE), near-field communication (NFC), wireless broadband (WiBro), Worldwide Interoperability for Microwave Access(WiMAX), Shared Wireless Access Protocol (SWAP), Wireless Gigabit Alliance (WiGig), or radio-frequency (RF) communication.

The communication interface 2100 according to some embodiments may transmit and receive data for controlling an operation of the electronic device 2000 to and from an external electronic device. For example, the communication interface 2100 may transmit and receive artificial intelligence models (e.g., an object detection model, an object recognition model, a graph generation model, a graph neural network, or a scene classification model) used by the electronic device 2000, to and from a server or the like. In addition, the electronic device 2000 may receive three-dimensional spatial data and object-related data from a server or the like. In addition, the electronic device 2000 may receive a spatial graph corresponding to a space from a server or the like. In addition, the electronic device 2000 may transmit and receive various pieces of data for generating/displaying a virtual space/metaverse space, to and from a server or the like.

The display 2200 may output information processed by the electronic device 2000. Meanwhile, in a case in which a display and a touch pad constitute a layer structure to form a touch screen, the display may serve as an input device in addition to an output device. The display may include at least one of a liquid-crystal display (LCD), a thin-film-transistor liquid-crystal display (TFT LCD), an organic light-emitting diode (OLED) display, a flexible display, a three-dimensional display, a micro display, or a head-mounted display (HMD).

The memory 2300 may store instructions, data structures, and program code that are readable by the processor 2400. A plurality of memories 2300 may be provided. In some embodiments, operations performed by the processor 2400 may be implemented by executing instructions or code of a program stored in the memory 2300.

The memory 2300 may include a non-volatile memory such as read-only memory (ROM) (e.g., programmable ROM (PROM), erasable programmable ROM (EPROM), or electrically erasable programmable ROM (EEPROM)), flash memory (e.g., a memory card, a solid-state drive (SSD)), or an analog recording type memory (e.g. a hard disk drive (HDD), a magnetic tape, or an optical disk), or a volatile memory such as random-access memory (RAM) (e.g., dynamic RAM (DRAM) or static RAM (SRAM)).

The memory 2300 according to some embodiments may store one or more instructions and a program that cause the electronic device 2000 to operate to provide object placement change-related information for a space. For example, the memory 2300 may store a data processing module 2310, a graph generation module 2320, and an artificial intelligence module 2330.

The processor 2400 may control overall operations of the electronic device 2000. For example, the processor 2400 may execute one or more instructions of a program stored in the memory 2300 to control the overall operations of the electronic device 2000 for providing object placement change-related information for a space. A plurality of processors 2400 may be provided.

One or more processors 2400 according to the disclosure may include at least one of a central processing unit (CPU), a graphics processing unit (GPU), an accelerated processing unit (APU), a many-integrated core (MIC) processor, a digital signal processor (DSP), or a neural processing unit (NPU). The one or more processors 2400 may be implemented in the form of an integrated system on a chip (SoC) including one or more electronic components. Each of the one or more processors may be implemented as separate hardware (H/W).

The processor 2400 may generally process object placement change-related data by using the data processing module 2310. For example, the processor 2400 may store three-dimensional spatial data obtained by performing a three-dimensional scan on the space, and object-related data, and perform preprocessing for generating a spatial graph. By using the data processing module 2310, the processor 2400 may manage a spatial graph generated for each space (e.g., a room or a living room) and store the spatial graph that is updated by performing computations for updating the spatial graph. The processor 2400 may process an obtained/received user input by using the data processing module 2310. The processor 2400 may generate a virtual space corresponding to a space and display the virtual space and virtual objects on the display 2200, by using the data processing module 2310. Detailed operations related to the data processing module 2310 are described in detail above with reference to the drawings, and thus, redundant descriptions will be omitted.

The processor 2400 may execute the graph generation module 2320 to generate a spatial graph corresponding to a space. The processor 2400 may generate the spatial graph based on three-dimensional spatial data and object-related data. The processor 2400 may generate a spatial graph based on a user input to a user interface for generating the spatial graph. Detailed operations related to the graph generation module 2320 are described in detail above with reference to the drawings, and thus, redundant descriptions will be omitted.

By using the artificial intelligence module 2330, the processor 2400 may execute various artificial intelligence models used to generate object placement change-related information for a space, and process data obtained from each of the various artificial intelligence models. The artificial intelligence module 2330 may include one or more artificial intelligence models. For example, the artificial intelligence module 2330 may include an object detection model, an object recognition model, a graph generation model, a graph neural network, a scene classification model, and the like, but is not limited thereto.

The above-described modules stored in the memory 2300 and executed by the processor 2400 are provided for convenience of description, and the disclosure is not necessarily limited thereto. Other modules may be added to implement the above-described embodiments, one module may be divided into a plurality of separate modules according to detailed functions, and some of the above-described modules may be combined to be implemented as one module.

In a case in which a method according to some embodiments includes a plurality of operations, the plurality of operations may be performed by one processor or by a plurality of processors. For example, when a first operation, a second operation, and a third operation are performed by the method according to some embodiments, the first operation, the second operation, and the third operation may all be performed by a first processor, and the first operation and the second operation may be performed by the first processor (e.g., a general-purpose processor) and the third operation may be performed by a second processor (e.g., a dedicated artificial intelligence processor). Here, a dedicated artificial intelligence processor, which is an example of the second processor, may perform operations for learning/inference of an artificial intelligence model. However, embodiments of the disclosure are not limited thereto.

The one or more processors according to the disclosure may be implemented as a single-core processor or a multi-core processor.

In a case in which a method according to some embodiments includes a plurality of operations, the plurality of operations may be performed by one core or by a plurality of cores included in the one or more processors.

The electronic device 2000 may further include one or more cameras 2500 and/or one or more sensors 2600. The electronic device 2000 may perform a three-dimensional scan on a space by using the one or more cameras 2500 and/or the one or more sensors 2600. For example, the one or more cameras 2500 and/or the one or more sensors 2600 may include an RGB-D sensor, a ToF sensor, a LiDAR sensor, a RADAR sensor, and the like, but are not limited thereto.

The electronic device 2000 may further include an input/output interface 2700. The input/output interface 2700 may include an input interface for receiving an input from a user, and an output interface for outputting signals other than image/video signals output from the display 2200.

The input interface is for receiving an input from the user. The input interface may include, but is not limited to, at least one of a key pad, a dome switch, a touch pad (e.g., a touch-type capacitive touch pad, a pressure-type resistive overlay touch pad, an infrared sensor-type touch pad, a surface acoustic wave conduction touch pad, an integration-type tension measurement touch pad, a piezoelectric effect-type touch pad), a jog wheel, or a jog switch.

The input interface may include a microphone, and thus, a speech recognition module may be stored in the memory of the electronic device 2000. The electronic device 2000 may receive a voice signal, which is an analog signal, through the microphone, and process the voice signal by using the speech recognition module. For example, the electronic device 2000 may convert a voice part into a computer-readable text by using an ASR model. The electronic device 2000 may interpret the text by using a natural language understanding (NLU) model to obtain an utterance intention of the user. Here, the ASR model or the NLU model may be an artificial intelligence model. Linguistic understanding is a technology for recognizing and applying/processing human language/characters, and may include natural language processing, machine translation, dialogue system, question answering, speech recognition/synthesis, and the like.

The output interface may include a speaker. The speaker may output an audio signal received from the communication interface 2100 or stored in the memory 2300.

Figure 13:
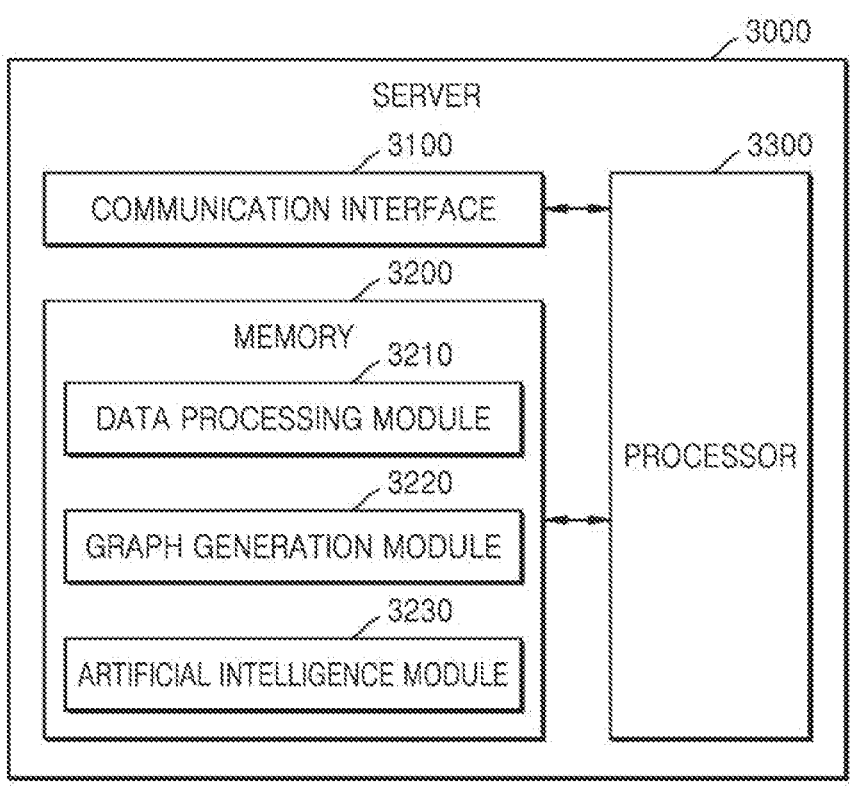
FIG. 13 is a block diagram illustrating a configuration of a server according to some embodiments.

FIG. 13 is a block diagram illustrating a configuration of a server according to some embodiments.

In some embodiments, at least some of the above-described operations of the electronic device 2000 may be performed by a server 3000.

The server 3000 according to some embodiments may include a communication interface 3100, a memory 3200, and a processor 3300. The communication interface 3100, the memory 3200, and the processor 3300 of the server 3000 correspond to the communication interface 2100, the memory 2300, and the processor 2400 of the electronic device 2000 illustrated in FIG. 12, respectively, and thus, redundant descriptions will be omitted for conciseness.

The server 3000 according to some embodiments may be a device having higher computing performance than that of the electronic device 2000 and thus capable of performing a larger amount of computation. The server 3000 may perform training of an artificial intelligence model requiring a relatively larger amount of computation than does inference. The server 3000 may perform inference by using an artificial intelligence model and transmit a result of the inference to the electronic device 2000.

The disclosure describes a method of inferring a category of an object to be placed in a space and/or a position of the object to be placed in the space by using a GNN and a spatial graph including objects in the space and positional relations between the objects in the space, for providing a user with object placement change-related information for the space.

The technical objectives of the disclosure are not limited to those mentioned above, and other technical objectives not mentioned herein may be clearly understood by those of skill in the art from descriptions below.

According to an aspect of the disclosure, there may be provided a method, performed by an electronic device, of providing information related to placing an object in a space. The method may include obtaining three-dimensional spatial data corresponding to the space and object-related data for first objects in the space. The method may further include obtaining a spatial graph including positional relations between the first objects in the space, based on the three-dimensional spatial data and the object-related data for the first objects, the spatial graph including nodes corresponding to attributes of the first objects and edges representing the positional relations between the first objects. The method may further include receiving a user input for changing object placement in the space. The method may further include, based on the user input, adding, to the spatial graph, an empty node representing a second object to be placed in an empty region in the space in which the first objects are not placed. The method may further include updating the spatial graph by applying, to a GNN, the spatial graph to which the empty node has been added. The method may further include outputting object placement change-related information for the space, based on the updated spatial graph.

The obtaining of the three-dimensional spatial data corresponding to the space and the object-related data for the first objects in the space may include obtaining the three-dimensional spatial data including a three-dimensional image of the space by performing a three-dimensional scan on the space.

The obtaining of the three-dimensional spatial data corresponding to the space and the object-related data for the first objects in the space may further include detecting the first objects from the three-dimensional image of the space.

The spatial graph may include a plurality of types of spatial graphs.

Each of the plurality of types of spatial graphs may correspond to each of a plurality of types of the positional relations between the first objects.

The plurality of types of the positional relations may include two or more of a 'co-occurring' positional relation, a 'supporting' positional relation, a 'supported-by' positional relation, a 'surrounding' positional relation, a 'surrounded-by' positional relation, and a 'next-to' positional relation.

The updating of the spatial graph may include inferring object feature vectors of the empty node by applying the spatial graph including the empty node to the GNN.

The updating of the spatial graph may further include predicting an edge to be connected to the empty node.

The inferred object feature vectors and the predicted edge may be determined by the GNN based on the attributes of the first objects.

The receiving of the user input may include receiving an input for selecting a first position in the empty region in which the first objects are not placed.

The adding of the empty node may include adding the empty node representing the second object to be adjacent to at least one node corresponding to at least one first object among the first objects, which is within a certain distance from the first position.

The outputting of the object placement change-related information for the space may include determining one or more object categories corresponding to the second object, which are able to be placed at the first position, based on the inferred object feature vectors.

The outputting of the object placement change-related information for the space may further include outputting the determined one or more object categories.

The receiving of the user input may include receiving a request for a recommendation for a position of the second object that is not currently placed in the space.

The adding of the empty node may include adding one or more empty node candidates to the spatial graph.

The updating of the spatial graph may further include inferring object feature vectors of each of the one or more empty node candidates by applying the spatial graph to the GNN.

The updating of the spatial graph may further include selecting one or more of the one or more empty node candidates based on the object feature vectors of each of the empty node candidates and an object category of the second object.

The outputting of the object placement change-related information for the space may include determining one or more positions in the space where the second object is to be placed, based on the object feature vectors of the selected one or more node.

The outputting of the object placement change-related information for the space may further include outputting the determined one or more positions.

The method may further include obtaining a preferred space image including features preferred by the user.

The method may further include obtaining a user-preferred spatial graph by using the preferred space image.

The method may further include personalizing the spatial graph by changing at least one of the nodes or the edges of the spatial graph, based on a result of comparing the user-preferred spatial graph with the spatial graph.

The method may further include outputting personalized recommendation information related to a change in the object placement in the space, based on the personalized spatial graph.

The personalized recommendation information may include at least one of a recommendation that positions of at least some of the first objects be changed, a recommendation that any one of the first objects be substituted with a third object, a recommendation that the third object be newly placed, or a recommendation for a style of the space.

The method may further include obtaining metaverse spatial data representing a metaverse space and object-related data for first metaverse objects in the metaverse space.

The method may further include obtaining a metaverse spatial graph in which features of the metaverse space whose physical space layout is different from a real space are reflected, based on the metaverse spatial data and the object-related data for the first metaverse objects.

The method may further include receiving a user input for placing a second metaverse object in the metaverse space.

The method may further include updating the metaverse spatial graph by applying the metaverse spatial graph to the GNN such that the metaverse spatial graph includes features of the real space.

The GNN may have further learned the spatial graph corresponding to the real space.

The method may further include outputting information for placing the second metaverse object in the metaverse space, based on the updated metaverse spatial graph.

The generating of the spatial graph may include obtaining the spatial graph by inputting the three-dimensional spatial data and the object-related data for the first objects to a spatial graph generation model.

According to an aspect of the disclosure, there may be provided the electronic device 2000 for providing information related to placing an object in a space. The electronic device 2000 may include the display 2200, the memory 2300 storing one or more instructions, and at least one processor 2400 configured to execute the one or more instructions stored in the memory 2300. The at least one processor 2400 may be further configured to execute the one or more instructions to obtain three-dimensional spatial data corresponding to the space and object-related data for first objects in the space. The at least one processor 2400 may be further configured to execute the one or more instructions to obtain a spatial graph including positional relations between the first objects in the space, based on the three-dimensional spatial data and the object-related data for the first objects. The spatial graph may include nodes corresponding to attributes of the first objects and edges representing the positional relations between the first objects. The at least one processor 2400 may be further configured to execute the one or more instructions to receive a user input for changing object placement in the space. The at least one processor 2400 may be further configured to execute the one or more instructions to, based on the user input, add, to the spatial graph, an empty node representing a second object to be placed in an empty region in the space in which the first objects are not placed. The at least one processor 2400 may be further configured to execute the one or more instructions to update the spatial graph by applying, to a GNN, the spatial graph to which the empty node has been added. The at least one processor 2400 may be further configured to execute the one or more instructions to output, through the display, object placement change-related information for the space based on the updated spatial graph.

The electronic device 2000 may further include a camera.

The at least one processor 2400 may be further configured to execute the one or more instructions to obtain the three-dimensional spatial data including a three-dimensional image of the space by using the camera to perform a three-dimensional scan on the space.

The at least one processor 2400 may be further configured to execute the one or more instructions to detect the first objects from the three-dimensional image of the space.

The spatial graph may include a plurality of types of spatial graphs.

Each of the plurality of types of spatial graphs may correspond to each of a plurality of types of the positional relations between the first objects.

The plurality of types of the positional relations may include two or more of a 'co-occurring' positional relation, a 'supporting' positional relation, a 'supported-by' positional relation, a 'surrounding' positional relation, a 'surrounded-by' positional relation, and a 'next-to' positional relation.

The at least one processor 2400 may be further configured to execute the one or more instructions to infer object feature vectors of the empty node by applying the spatial graph including the empty node to the GNN.

The at least one processor 2400 may be further configured to execute the one or more instructions to predict an edge to be connected to the empty node.

The inferred object feature vectors and the predicted edge may be determined by the GNN based on the attributes of the first objects.

The at least one processor 2400 may be further configured to execute the one or more instructions to receive an input for selecting a first position in the empty region in which the first objects are not placed.

The at least one processor 2400 may be further configured to execute the one or more instructions to add the empty node representing the second object to be adjacent to at least one node corresponding to at least one first object among the first objects, which is within a certain distance from the first position.

The at least one processor 2400 may be further configured to execute the one or more instructions to determine one or more object categories corresponding to the second object, which are able to be placed at the first position, based on the inferred object feature vectors.

The at least one processor 2400 may be further configured to execute the one or more instructions to output the determined one or more object categories.

The at least one processor 2400 may be further configured to execute the one or more instructions to receive a request for a recommendation for a position of the second object that is not currently placed in the space.

The at least one processor 2400 may be further configured to execute the one or more instructions to add one or more empty node candidates to the spatial graph.

The at least one processor 2400 may be further configured to execute the one or more instructions to infer object feature vectors of each of the one or more empty node candidates by applying the spatial graph to the GNN.

The at least one processor 2400 may be further configured to execute the one or more instructions to select one or more of the one or more empty node candidates based on the object feature vectors of each of the empty node candidates and an object category of the second object.

The at least one processor 2400 may be further configured to execute the one or more instructions to determine one or more positions in the space where the second object is to be placed, based on the object feature vectors of the selected one or more node.

The at least one processor 2400 may be further configured to execute the one or more instructions to output the determined one or more positions.

The at least one processor 2400 may be further configured to execute the one or more instructions to obtain a preferred space image including features preferred by the user.

The at least one processor 2400 may be further configured to execute the one or more instructions to obtain a user-preferred spatial graph by using the preferred space image.

The at least one processor 2400 may be further configured to execute the one or more instructions to personalizing the spatial graph by changing at least one of the nodes or the edges of the spatial graph, based on a result of comparing the user-preferred spatial graph with the spatial graph.

The at least one processor 2400 may be further configured to execute the one or more instructions to output personalized recommendation information related to a change in the object placement in the space, based on the personalized spatial graph.

The personalized recommendation information may include at least one of a recommendation that positions of at least some of the first objects be changed, a recommendation that any one of the first objects be substituted with a third object, a recommendation that the third object be newly placed, or a recommendation for a style of the space.

The at least one processor 2400 may be further configured to execute the one or more instructions to obtain metaverse spatial data representing a metaverse space and object-related data for first metaverse objects in the metaverse space.

The at least one processor 2400 may be further configured to execute the one or more instructions to obtain a metaverse spatial graph in which features of the metaverse space whose physical space layout is different from a real space are reflected, based on the metaverse spatial data and the object-related data for the first metaverse objects.

The at least one processor 2400 may be further configured to execute the one or more instructions to receive a user input for placing a second metaverse object in the metaverse space.

The at least one processor 2400 may be further configured to execute the one or more instructions to update the metaverse spatial graph by applying the metaverse spatial graph to the GNN such that the metaverse spatial graph includes features of the real space.

The GNN may have further learned the spatial graph corresponding to the real space.

The at least one processor 2400 may be further configured to execute the one or more instructions to output information for placing the second metaverse object in the metaverse space, based on the updated metaverse spatial graph.

The embodiments of the disclosure may be implemented as a recording medium including computer-executable instructions such as a computer-executable program module. A computer-readable medium may be any available medium which is accessible by a computer, and may include a volatile or non-volatile medium and a removable or non-removable medium. The computer-readable medium may include a computer storage medium and a communication medium. The computer storage media include both volatile and non-volatile, removable and non-removable media implemented in any method or technique for storing information such as computer readable instructions, data structures, program modules or other data. The communication medium may typically include computer-readable instructions, data structures, or other data of a modulated data signal such as program modules.

The computer-readable storage medium may be provided in the form of a non-transitory storage medium. Here, the term 'non-transitory storage medium' refers to a tangible device and does not include a signal (e.g., an electromagnetic wave), and the term 'non-transitory storage medium' does not distinguish between a case where data is stored in a storage medium semi-permanently and a case where data is stored temporarily. For example, the non-transitory storage medium may include a buffer in which data is temporarily stored.

According to some embodiments, the methods according to various embodiments disclosed herein may be included in a computer program product and then provided. The computer program product may be traded as commodities between sellers and buyers. The computer program product may be distributed in the form of a machine-readable storage medium (e.g., a compact disc (CD) ROM (CD-ROM), or may be distributed online (e.g., downloaded or uploaded) through an application store or directly between two user devices (e.g., smart phones). In a case of online distribution, at least a portion of the computer program product (e.g., a downloadable app) may be temporarily stored in a machine-readable storage medium such as a manufacturer's server, an application store's server, or a memory of a relay server.

While the disclosure have been particularly shown and described, it will be understood by one of ordinary skill in the art that various changes in form and details may be made therein without departing from the spirit and scope of the disclosure. Hence, it should be understood that the above-described embodiments are not limiting of the scope of the disclosure. For example, each element described in a single type may be executed in a distributed manner, and elements described distributed may also be executed in an integrated form.

The scope of the disclosure is not defined by the detailed description of the disclosure but by the following claims, and all modifications or alternatives derived from the scope and spirit of the claims and equivalents thereof fall within the scope of the disclosure.

The invention claimed is:

1. A method, performed by an electronic device, the method comprising:
   obtaining three-dimensional spatial data corresponding to a space and object-related data for a plurality of first objects in the space;
   obtaining a spatial graph comprising positional relations between the plurality of first objects in the space, based on the three-dimensional spatial data and the object-related data, the spatial graph comprising nodes corresponding to attributes of the plurality of first objects and edges representing the positional relations between the plurality of first objects;
   receiving a user input for changing an object placement in the space;
   based on the user input, adding, to the spatial graph, an empty node representing a second object to be placed in an empty region in the space in which the plurality of first objects are not placed;
   updating the spatial graph by applying, to a graph neural network (GNN), the spatial graph to which the empty node has been added; and
   outputting object placement change-related information for the space, based on the spatial graph that has been updated,
   wherein updating the spatial graph comprises:
      inferring a plurality of object feature vectors of the empty node by applying the spatial graph comprising the empty node to the GNN; and
      predicting an edge to be connected to the empty node, and
   wherein the plurality of object feature vectors and the edge are determined by the GNN based on the attributes of the plurality of first objects.

2. The method of claim 1, wherein obtaining of the three-dimensional spatial data corresponding to the space and the object-related data for the plurality of first objects in the space comprises:
   obtaining the three-dimensional spatial data comprising a three-dimensional image of the space by performing a three-dimensional scan on the space; and
   detecting the plurality of first objects from the three-dimensional image.

3. The method of claim 1, wherein:
   the spatial graph comprises a plurality of types of spatial graphs, each of the plurality of types of spatial graphs corresponds to each of a plurality of types of the positional relations between the plurality of first objects, and
   the plurality of types of the positional relations comprise two or more of a 'co-occurring' positional relation, a 'supporting' positional relation, a 'supported-by' positional relation, a 'surrounding' positional relation, a 'surrounded-by' positional relation, and a 'next-to' positional relation.

4. The method of claim 1, wherein receiving the user input comprises receiving an input for selecting a first position in the empty region in which the plurality of first objects are not placed, adding the empty node comprises adding the empty node-adjacent to at least one node corresponding to at least one first object among the plurality of first objects, which is within a certain distance from the first position, and outputting the object placement change-related information for the space comprises:

determining one or more object categories corresponding to the second object, which are able to be placed at the first position, based on the plurality of object feature vectors; and outputting the one or more object categories.

5. The method of claim 1, wherein receiving the user input comprises receiving a request for a recommendation for a position of the second object that is not currently placed in the space, adding the empty node comprises adding one or more empty node candidates to the spatial graph, updating the spatial graph further comprises:

inferring the plurality of object feature vectors of each of the one or more empty node candidates by applying the spatial graph to the GNN; and selecting one or more nodes of the one or more empty node candidates based on the plurality of object feature vectors of the one or more empty node candidates and an object category of the second object, and outputting the object placement change-related information for the space comprises:

determining one or more positions in the space where the second object is to be placed, based on the plurality of object feature vectors of the one or more nodes that have been selected; and outputting the one or more positions.

6. The method of claim 1, further comprising:

obtaining a space image comprising features preferred by a user;

obtaining a user-preferred spatial graph based on the space image;

obtaining a personalized spatial graph by changing at least one of the nodes or the edges of the spatial graph, based on a result of comparing the user-preferred spatial graph with the spatial graph; and outputting personalized recommendation information related to a change in the object placement in the space, based on the personalized spatial graph.

7. The method of claim 6, wherein the personalized recommendation information comprises at least one of a recommendation that positions of at least some of the plurality of first objects be changed, a recommendation that any one of the plurality of first objects be substituted with a third object, a recommendation that the third object be newly placed, or a recommendation for a style of the space.

8. The method of claim 1, further comprising:

obtaining metaverse spatial data representing a metaverse space and object-related metaverse data for a plurality of first metaverse objects in the metaverse space;

obtaining a metaverse spatial graph in which features of the metaverse space whose physical space layout is different from a real space are reflected, based on the metaverse spatial data and the object-related metaverse data;

receiving a user input for placing a second metaverse object in the metaverse space;

updating the metaverse spatial graph by applying the metaverse spatial graph to the GNN such that the metaverse spatial graph comprises features of the real space, the GNN having further learned the metaverse spatial graph corresponding to the real space; and outputting information for placing the second metaverse object in the metaverse space, based on the metaverse spatial graph that has been updated.

9. The method of claim 1, wherein generating the spatial graph comprises obtaining the spatial graph by inputting the three-dimensional spatial data and the object-related data for the plurality of first objects to a spatial graph generation model and receiving the spatial graph as an output from the spatial graph generation model.

10. An electronic device comprising:

a display;

a memory storing one or more instructions; and at least one processor configured to access the memory and execute the one or more instructions stored in the memory to at least:

obtain three-dimensional spatial data corresponding to a space and object-related data for a plurality of first objects in the space, obtain a spatial graph comprising positional relations between the plurality of first objects in the space, based on the three-dimensional spatial data and the object-related data, the spatial graph comprising nodes corresponding to attributes of the plurality of first objects and edges representing the positional relations between the plurality of first objects, receive a user input for changing an object placement in the space, based on the user input, add, to the spatial graph, an empty node representing a second object to be placed in an empty region in the space in which the plurality of first objects are not placed, update the spatial graph by applying, to a graph neural network (GNN), the spatial graph to which the empty node has been added, and output, through the display, object placement change-related information for the space based on the spatial graph that has been updated, wherein the at least one processor is further configured to execute the one or more instructions to infer a plurality of object feature vectors of the empty node by applying the spatial graph comprising the empty node to the GNN, and predict an edge to be connected to the empty node, and wherein the plurality of object feature vectors and the edge are determined by the GNN based on the attributes of the plurality of first objects.

11. The electronic device of claim 10, further comprising a camera, wherein the at least one processor is further configured to execute the one or more instructions to:

obtain the three-dimensional spatial data comprising a three-dimensional image of the space by using the camera to perform a three-dimensional scan on the space, and detect the plurality of first objects from the three-dimensional image.

12. The electronic device of claim 10, wherein the spatial graph comprises a plurality of types of spatial graphs, each of the plurality of types of spatial graphs corresponds to each of a plurality of types of the positional relations between the plurality of first objects, and the plurality of types of the positional relations comprise two or more of a 'co-occurring' positional relation, a 'supporting' positional relation, a 'supported-by' positional relation, a 'surrounding' positional relation, a 'surrounded-by' positional relation, and a 'next-to' positional relation.

13. The electronic device of claim 10, wherein the at least one processor is further configured to execute the one or more instructions to:

receive an input for selecting a first position in the empty region in which the plurality of first objects are not placed, add the empty node adjacent to at least one node corresponding to at least one first object among the plurality of first objects, which is within a certain distance from the first position, determine one or more object categories corresponding to the second object, which are able to be placed at the first position, based on the plurality of object feature vectors, and output the one or more object categories.

14. The electronic device of claim 10, wherein the at least one processor is further configured to execute the one or more instructions to:

receive a request for a recommendation for a position of the second object that is not currently placed in the space, add one or more empty node candidates to the spatial graph, infer the plurality of object feature vectors of each of the one or more empty node candidates by applying the spatial graph to the GNN, select one or more nodes of the one or more empty node candidates based on the plurality of object feature vectors of the one or more empty node candidates and an object category of the second object, determine one or more positions in the space where the second object is to be placed, based on the plurality of object feature vectors of the one or more nodes that have been selected, and output the one or more positions.

15. The electronic device of claim 10, wherein the at least one processor is further configured to execute the one or more instructions to:

obtain a space image comprising features preferred by a user, obtain a user-preferred spatial graph based on the space image, obtain a personalized spatial graph by changing at least one of the nodes or the edges of the spatial graph, based on a result of comparing the user-preferred spatial graph with the spatial graph, and output personalized recommendation information related to a change in the object placement in the space, based on the personalized spatial graph.

16. The electronic device of claim 15, wherein the personalized recommendation information comprises at least one of a recommendation that positions of at least some of the plurality of first objects be changed, a recommendation that any one of the plurality of first objects be substituted with a third object, a recommendation that the third object be newly placed, or a recommendation for a style of the space.

17. The electronic device of claim 10, wherein the at least one processor is further configured to execute the one or more instructions to:

obtain metaverse spatial data representing a metaverse space and object-related metaverse data for a plurality of first metaverse objects in the metaverse space, obtain a metaverse spatial graph in which features of the metaverse space whose physical space layout is different from a real space are reflected, based on the metaverse spatial data and the object-related metaverse data, receive a user input for placing a second metaverse object in the metaverse space, update the metaverse spatial graph by applying the metaverse spatial graph to the GNN such that the metaverse spatial graph comprises features of the real space, the GNN having further learned the metaverse spatial graph corresponding to the real space, and output information for placing the second metaverse object in the metaverse space, based on the metaverse spatial graph that has been updated.

18. A non-transitory computer-readable recording medium having recorded thereon computer code which, when executed by a computer, causes the computer to at least:

obtain three-dimensional spatial data corresponding to a space and object-related data for a plurality of first objects in the space;

obtain a spatial graph comprising positional relations between the plurality of first objects in the space, based on the three-dimensional spatial data and the object-related data, the spatial graph comprising nodes corresponding to attributes of the plurality of first objects and edges representing the positional relations between the plurality of first objects;

receive a user input for changing an object placement in the space;

based on the user input, add, to the spatial graph, an empty node representing a second object to be placed in an empty region in the space in which the plurality of first objects are not placed;

update the spatial graph by applying, to a graph neural network (GNN), the spatial graph to which the empty node has been added; and output object placement change-related information for the space, based on the spatial graph that has been updated, wherein the spatial graph is updated by:

inferring a plurality of object feature vectors of the empty node by applying the spatial graph comprising the empty node to the GNN; and predicting an edge to be connected to the empty node, and wherein the plurality of object feature vectors and the edge are determined by the GNN based on the attributes of the plurality of first objects.

* * * * *